United States Patent
Miwa et al.

(10) Patent No.: US 9,446,566 B2
(45) Date of Patent: Sep. 20, 2016

(54) LAMINATE, METHOD FOR CUTTING LAMINATE, METHOD FOR PROCESSING LAMINATE, AND DEVICE AND METHOD FOR CUTTING BRITTLE PLATE-LIKE OBJECT

(75) Inventors: Yoshiharu Miwa, Shiga (JP); Yoshinori Hasegawa, Shiga (JP); Takayuki Noda, Shiga (JP); Hiroki Mori, Shiga (JP); Michiharu Eta, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 210 days.

(21) Appl. No.: 14/117,127

(22) PCT Filed: May 14, 2012

(86) PCT No.: PCT/JP2012/062304
§ 371 (c)(1),
(2), (4) Date: Nov. 12, 2013

(87) PCT Pub. No.: WO2012/157610
PCT Pub. Date: Nov. 22, 2012

(65) Prior Publication Data
US 2015/0110991 A1 Apr. 23, 2015

(30) Foreign Application Priority Data

May 13, 2011 (JP) .................. 2011-108458
Nov. 11, 2011 (JP) .................. 2011-247451
Nov. 18, 2011 (JP) .................. 2011-252966

(51) Int. Cl.
*B32B 17/10* (2006.01)
*C03B 33/07* (2006.01)
(Continued)

(52) U.S. Cl.
CPC ....... *B32B 17/10155* (2013.01); *B23K 26/083* (2013.01); *B23K 26/40* (2013.01);
(Continued)

(58) Field of Classification Search
CPC ............ B32B 17/10; B32B 17/10036; B32B 17/10155; B32B 3/02; B32B 2250/40; B32B 2315/08; B32B 2250/02; B32B 2250/03; B32B 2457/20; B32B 2457/208
USPC ......................... 428/189, 192, 426
See application file for complete search history.

(56) References Cited

U.S. PATENT DOCUMENTS 2,022,530 A 11/1935 White
4,467,168 A 8/1984 Morgan et al.
(Continued)

FOREIGN PATENT DOCUMENTS

CN 1642687 7/2005
CN 101244886 8/2008
(Continued)

OTHER PUBLICATIONS

Translation of JP 2010-018505, Kondo et al., published Jan. 28, 2010.*
Japanese Office Action mailed Aug. 7, 2015, in Japanese Application No. 2012-110812 (with partial English translation).
Japanese Office Action issued Aug. 5, 2015, in Japanese Application No. 2012-110810 (with partial English translation).
(Continued)

*Primary Examiner* — Catherine A Simone
(74) *Attorney, Agent, or Firm* — Wenderoth, Lind & Ponack, L.L.P.

(57) ABSTRACT

Provided is a laminate (1) obtained by integrally laminating glass sheets (4) on both surfaces of a resin sheet (2). The glass sheets (4) have a thickness of 300 μm or less and end surfaces (4a) of the glass sheets (4) are chamfered.

11 Claims, 18 Drawing Sheets

(51) Int. Cl.

| | | |
|---|---|---|
| *C03B 33/09* | (2006.01) | |
| *C03B 33/04* | (2006.01) | |
| *B28D 1/22* | (2006.01) | |
| *B23K 26/08* | (2014.01) | |
| *B32B 3/02* | (2006.01) | |
| *B32B 3/30* | (2006.01) | |
| *B32B 7/12* | (2006.01) | |
| *C03B 21/02* | (2006.01) | |
| *B23K 26/40* | (2014.01) | |
| *B29C 67/00* | (2006.01) | |
| *B32B 37/14* | (2006.01) | |
| *G02F 1/1333* | (2006.01) | |

(52) U.S. Cl.
CPC .......... *B28D 1/221* (2013.01); *B29C 67/0044* (2013.01); *B32B 3/02* (2013.01); *B32B 3/30* (2013.01); *B32B 7/12* (2013.01); *B32B 17/10036* (2013.01); *B32B 17/1099* (2013.01); *B32B 17/10293* (2013.01); *B32B 17/10706* (2013.01); *B32B 17/10743* (2013.01); *B32B 37/14* (2013.01); *C03B 21/02* (2013.01); *C03B 33/04* (2013.01); *C03B 33/074* (2013.01); *C03B 33/076* (2013.01); *C03B 33/091* (2013.01); *B23K 2203/16* (2013.01); *B23K 2203/172* (2015.10); *B23K 2203/50* (2015.10); *B32B 2250/02* (2013.01); *B32B 2250/03* (2013.01); *B32B 2250/40* (2013.01); *B32B 2315/08* (2013.01); *B32B 2457/12* (2013.01); *B32B 2457/20* (2013.01); *B32B 2457/208* (2013.01); *G02F 1/133351* (2013.01); *Y10T 156/1052* (2015.01); *Y10T 156/1082* (2015.01); *Y10T 428/24322* (2015.01); *Y10T 428/24488* (2015.01)

(56) References Cited

U.S. PATENT DOCUMENTS

| | | |
|---|---|---|
| 5,475,196 A | 12/1995 | Lisec |
| 5,622,540 A | 4/1997 | Stevens |
| 5,667,897 A | 9/1997 | Hashemi et al. |
| 5,704,959 A | 1/1998 | Lisec |
| 6,815,070 B1 | 11/2004 | Bürkle et al. |
| 2002/0125232 A1 | 9/2002 | Choo et al. |
| 2003/0077453 A1 | 4/2003 | Oaku et al. |
| 2005/0142812 A1 | 6/2005 | Kurosawa |
| 2005/0202596 A1 | 9/2005 | Fukuyo et al. |
| 2006/0011593 A1 | 1/2006 | Fukuyo et al. |
| 2007/0053088 A1 | 3/2007 | Kranz et al. |
| 2007/0228616 A1 | 10/2007 | Bang |
| 2008/0050888 A1 | 2/2008 | Garner et al. |
| 2008/0135175 A1 | 6/2008 | Higuchi |
| 2009/0110882 A1 | 4/2009 | Higuchi |
| 2010/0015783 A1 | 1/2010 | Fukuyo et al. |
| 2010/0167059 A1 | 7/2010 | Hashimoto et al. |
| 2011/0003619 A1 | 1/2011 | Fujii |
| 2011/0026236 A1 | 2/2011 | Kondo et al. |
| 2012/0202030 A1 | 8/2012 | Kondo et al. |
| 2012/0205358 A1 | 8/2012 | Fukuyo et al. |
| 2012/0208028 A1 | 8/2012 | Hashimoto et al. |
| 2013/0252402 A1 | 9/2013 | Fukuyo et al. |
| 2013/0344686 A1 | 12/2013 | Fukuyo et al. |
| 2014/0080288 A1 | 3/2014 | Fukuyo et al. |
| 2014/0202985 A1 | 7/2014 | Fujii |
| 2014/0342146 A1 | 11/2014 | Hashimoto et al. |

FOREIGN PATENT DOCUMENTS

| | | |
|---|---|---|
| CN | 101437772 | 5/2009 |
| CN | 101987775 | 3/2011 |
| CN | 102007524 | 4/2011 |
| DE | 10 2007 008 634 | 8/2008 |
| DE | 10 2008 048 255 | 4/2010 |
| EP | 1 238 743 | 9/2002 |
| EP | 2 279 983 | 2/2011 |
| FR | 2 948 357 | 1/2011 |
| GB | 1 359 167 | 7/1974 |
| JP | 60-231427 | 11/1985 |
| JP | 63-6839 | 1/1988 |
| JP | 63-69728 | 3/1988 |
| JP | 6-40751 | 2/1994 |
| JP | 07-043696 | 2/1995 |
| JP | 7-186023 | 7/1995 |
| JP | 9-278466 | 10/1997 |
| JP | 10-506367 | 6/1998 |
| JP | 11-165247 | 6/1999 |
| JP | 2000-319040 | 11/2000 |
| JP | 2002-128546 | 5/2002 |
| JP | 2002-192371 | 7/2002 |
| JP | 2003-039597 | 2/2003 |
| JP | 2003-048763 | 2/2003 |
| JP | 2003-122269 | 4/2003 |
| JP | 2004-119625 | 4/2004 |
| JP | 2004-182530 | 7/2004 |
| JP | 2005-104819 | 4/2005 |
| JP | 2005-179154 | 7/2005 |
| JP | 2006-124209 | 5/2006 |
| JP | 2006-326785 | 12/2006 |
| JP | 3929393 | 6/2007 |
| JP | 2007-197288 | 8/2007 |
| JP | 2007-260708 | 10/2007 |
| JP | 2008-37094 | 2/2008 |
| JP | 2008-168327 | 7/2008 |
| JP | 2009-149471 | 7/2009 |
| JP | 2009-242185 | 10/2009 |
| JP | 2010-018505 | 1/2010 |
| JP | 2010-168270 | 8/2010 |
| JP | 2010-234518 | 10/2010 |
| JP | 2011-51278 | 3/2011 |
| KR | 10-2011-0029522 | 3/2011 |
| WO | 96/10482 | 4/1996 |
| WO | 2007/018028 | 2/2007 |
| WO | 2009/078406 | 6/2009 |
| WO | 2009/084489 | 7/2009 |
| WO | 2011/048978 | 4/2011 |
| WO | 2011/090004 | 7/2011 |

OTHER PUBLICATIONS

Chinese Office Action issued Sep. 3, 2014 in corresponding Chinese Patent Application No. 201280023006.X with English translation.
International Search Report issued Aug. 14, 2012 in International (PCT) Application No. PCT/JP2012/062304.
International Preliminary Report on Patentability and Written Opinion of the International Searching Authority issued Nov. 28, 2013 in International (PCT) Application No. PCT/JP2012/062304.
Japanese Office Action issued Jun. 3, 2015 in corresponding Japanese Patent Application No. 2011-247451 with partial English translation.
Partial Supplementary European Search Report issued Dec. 9, 2014 in corresponding European application No. 12785092.3.
XP-002732636—Advanced Materials Schott AG: "Technical Properties D263 T", Jan. 2009, pp. 1-11.
Extended European Search Report issued Apr. 8, 2015 in corresponding European Patent Application No. 12785092.3.
Chinese Office Action issued Apr. 18, 2016 in counterpart Chinese Patent Application No. 201510028722.2 with partial English translation.
Chinese Office Action issued Feb. 1, 2016 in corresponding Chinese Patent Application No. 201510028710.X (partial English translation).
Office Action issued Feb. 2, 2016 in corresponding Chinese Application No. 201510027731.X, with partial English translation.
Extended European Search Report issued Mar. 11, 2016 in counterpart European Patent Application No. 15197229.6.

\* cited by examiner

FIG. 11

| | EXAMPLE 1 | EXAMPLE 2 | EXAMPLE 3 | EXAMPLE 4 | EXAMPLE 5 |
|---|---|---|---|---|---|
| CROSS-SECTIONAL SHAPE OF LAMINATE END PORTION | | | | | |
| CONTACT ANGLE 60° | CHIPPING | 10 | 2 | 5 | 0 | 0 |
| | SEPARATION | 6 | 3 | 5 | 0 | 0 |

| | COMPARATIVE EXAMPLE 1 |
|---|---|
| CROSS-SECTIONAL SHAPE OF LAMINATE END PORTION | |
| CONTACT ANGLE 60° | CHIPPING | 95 |
| | SEPARATION | 9 |

FIG. 12
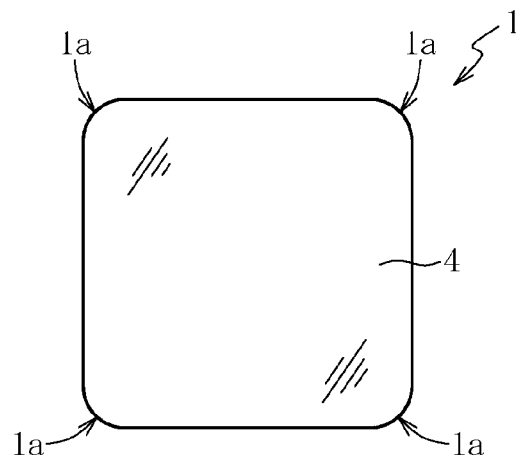
FIG. 13
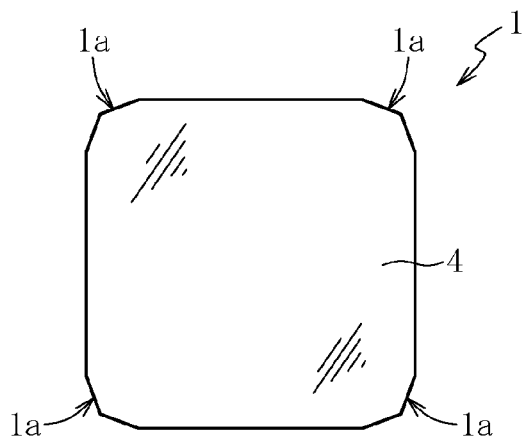
FIG. 14
| | EXAMPLE 6 | EXAMPLE 7 | COMPARATIVE EXAMPLE 2 |
|---|---|---|---|
| SHAPE OF CORNER PORTION | | | |
| SEPARATION | ABSENT | ABSENT | PRESENT AT EDGE PORTIONS |

FIG. 15
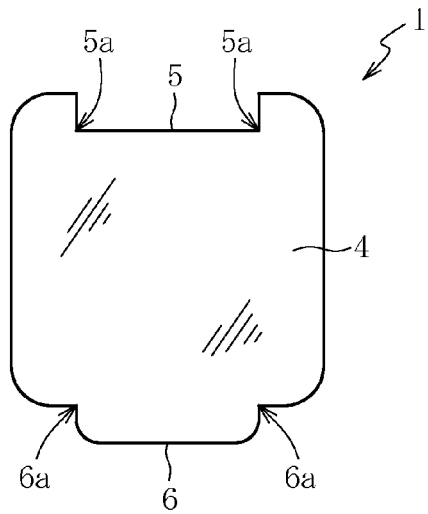
FIG. 16
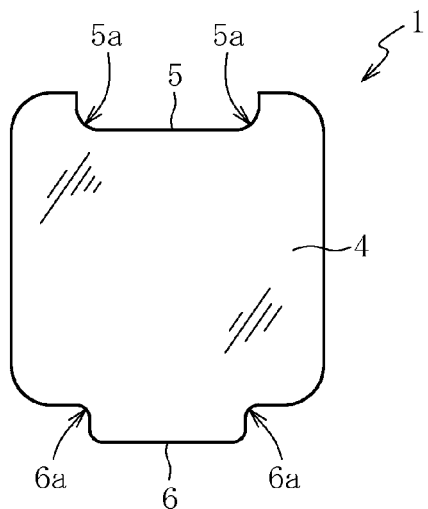
FIG. 17
| | EXAMPLE 8 | COMPARATIVE EXAMPLE 3 | COMPARATIVE EXAMPLE 4 |
|---|---|---|---|
| SHAPE OF EDGE PORTION HAVING ANGLE OF MORE THAN 180° | | | |
| BREAKING | ABSENT | PRESENT | PRESENT |

FIG. 18
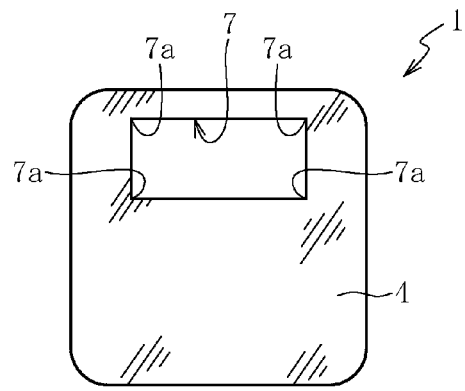
FIG. 19
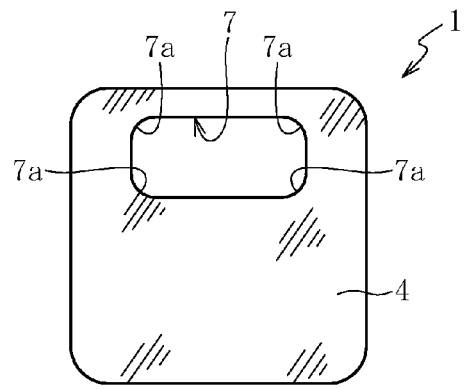
FIG. 20
| | EXAMPLE 9 | EXAMPLE 10 | COMPARATIVE EXAMPLE 5 | COMPARATIVE EXAMPLE 6 |
|---|---|---|---|---|
| SHAPE OF BENDING PORTION OF DEPRESSED PORTION | | | | |
| CURVATURE RADIUS OF ROUNDED PORTION AT EDGE PORTION (mm) | 2 | 5 | — | — |
| BREAKING | ABSENT | ABSENT | PRESENT | PRESENT |

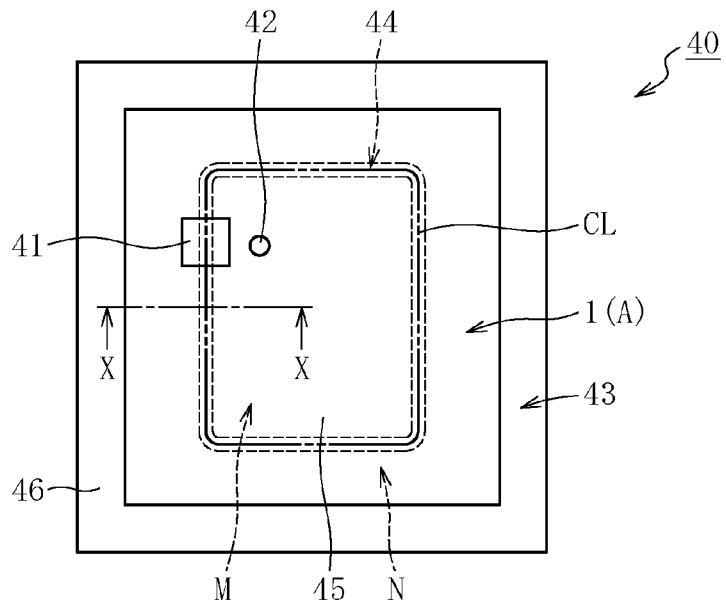
FIG. 34b
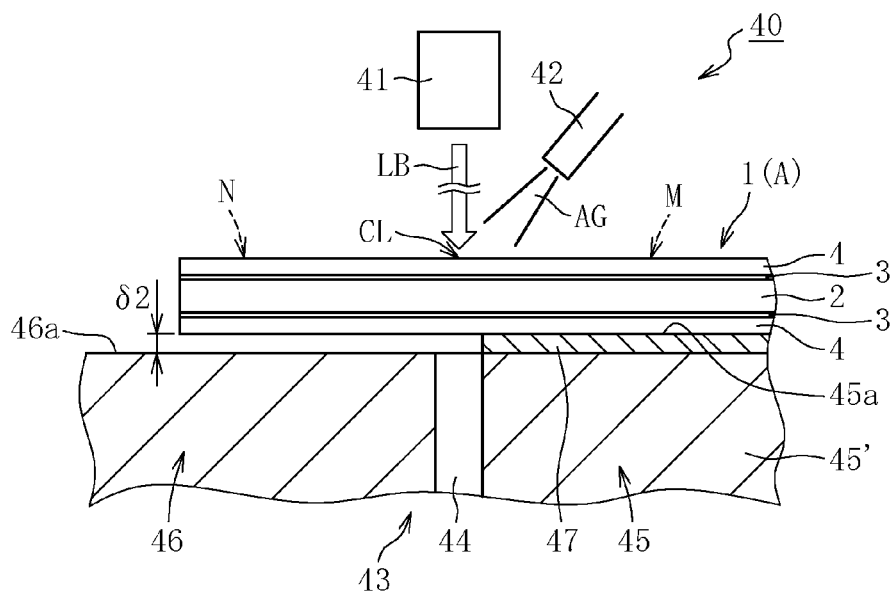
FIG. 34c
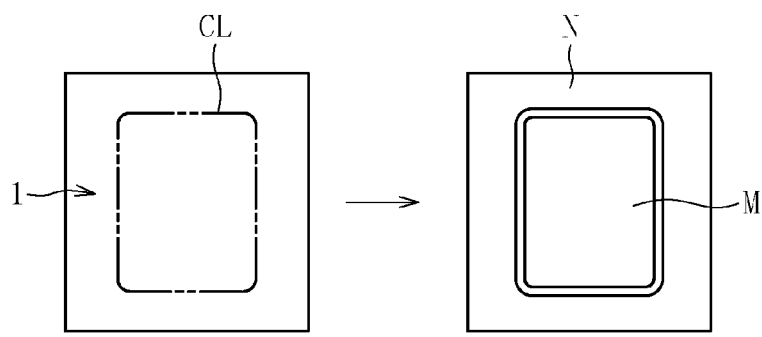

LAMINATE, METHOD FOR CUTTING LAMINATE, METHOD FOR PROCESSING LAMINATE, AND DEVICE AND METHOD FOR CUTTING BRITTLE PLATE-LIKE OBJECT

TECHNICAL FIELD

The present invention relates to an improvement of a brittle sheet-like object such as a laminate obtained by integrally laminating a glass sheet on a resin sheet, and to an improvement of a cutting technology and a processing technology therefor.

BACKGROUND ART

Laminates obtained by integrally laminating a glass sheet on at least one of both surfaces of a resin sheet (glass sheet laminates) have various characteristics such as high hardness, high durability, high airtightness, gas barrier property, and luxury appearance, which are derived from the glass, and also have various characteristics such as lightweight property and high impact resistance, which are derived from the resin. Thus, the laminates of this type are expected for use in a wide variety of fields, for example, as materials for panels of electric and electronic devices as typified by flat panel displays (FPDs) such as liquid crystal displays and plasma displays, portable electronic devices such as mobile phones and tablet PCs, solar cells, and induction cookers, or as materials for window panels of building structures and various vehicles. In particular, as described in Patent Literatures 1 and 2, a laminate obtained by integrally laminating a relatively thinner glass sheet on a relatively thicker resin sheet may contribute to lightweighting of various panels as compared to a case of using a glass sheet having the same thickness as the laminate. Thus, the laminate is expected for use in applications that promote lightweighting of products, such as FPDs and portable electronic devices.

CITATION LIST

Patent Literature 1: JP 2003-39597 A
Patent Literature 2: JP 07-43696 A

SUMMARY OF INVENTION

Technical Problems

<First Technical Object>
By the way, in a case where the glass sheet of the laminate is thinned to, for example, a thickness of 300 μm or less, if an edge portion of an end surface of the glass sheet is angulated, there is a risk in that the glass sheet may be damaged when another member such as conveyance means strikes against the glass sheet.

Even if the glass sheet is not damaged, there may arise another problem in that the resin sheet and the glass sheet are separated from each other when another member strikes against the glass sheet. Such separation is mainly caused by stress concentration that occurs in the end surface of the glass sheet when another member strikes against the glass sheet. Further, when the glass sheet is separated from the resin sheet, the glass sheet may be damaged later on due to the separation, and there arises a new problem in that the shape of the appearance is deteriorated, resulting in reduction in commercial value of the product.

In Patent Literature 1, however, the edge portion of the end surface of the glass sheet integrally laminated on the resin sheet is angulated and sharpened, and hence no consideration is taken for the damage to the glass sheet and the separation that occurs between the glass sheet and the resin sheet (see FIG. 1 of Patent Literature 1 and FIG. 1 of Patent Literature 2).

Further, apart from the shape of the end surface of the glass sheet, in Patent Literatures 1 and 2, the end surface of the glass sheet and the end surface of the resin sheet are located on the same plane, thus increasing a probability that another member is brought into direct contact with the end surface of the glass sheet. Therefore, the above-mentioned problems of the damage to the glass sheet and the separation of the glass sheet are liable to arise.

Still further, in general, expansion and contraction of the resin sheet due to a temperature change are extremely significant relative to the glass sheet. Therefore, if the end surface of the resin sheet and the end surface of the glass sheet are aligned on the same plane, when the resin sheet contracts due to the temperature change, there may occur, depending on the manner of adhesion, such a situation that the end surface of the glass sheet protrudes with respect to the end surface of the resin sheet. In this case, the probability of contact between the end surface of the glass sheet and another member increases significantly, and hence the problems of the damage to the glass sheet and the separation of the glass sheet become more conspicuous.

The present invention has been made in view of the above-mentioned circumstances, and it is therefore a first technical object thereof to reduce damage to a glass sheet and separation of the glass sheet in a laminate obtained by integrally laminating the glass sheet on a resin sheet.

<Second Technical Object>
By the way, the above-mentioned laminate is generally used by being cut into a shape and dimensions in accordance with the intended application.

When the laminate is ground through use of a diamond tool or the like for processing glass, however, resin chips resulting from the grinding adhere to a grinding surface of the tool so as to clog the tool. Thus, the grinding performance is decreased earlier. As a result, the processing rate is decreased significantly, and further, excessive runout occurs in the tool, thus leading to a risk of damage to the tool and the laminate.

When the laminate is ground through use of a cutting blade for processing a resin, on the other hand, the cutting blade applies an excessive impact to the glass sheet, thus leading to the risk of damage to the glass sheet.

In view of the above, the inventors of the present invention conducted extensive studies focusing on laser fusing as a method of cutting a laminate. As a result, the inventors of the present invention found the following new problems.

That is, when the amount of heat of the laser fusing is insufficient, only the resin sheet is cut, and thus the glass sheet cannot be cut. When the amount of heat of the laser fusing is excessively large, on the other hand, the entire laminate can be cut, but the resin sheet is ignited and a large crack is generated in a cut surface of the glass sheet.

The present invention has been made in view of the above-mentioned circumstances, and it is therefore a second technical object thereof to set an appropriate amount of heat of laser fusing, thereby accurately cutting a laminate obtained by integrally laminating a glass sheet on a resin sheet.

<Third Technical Object>

Further, as the cutting method for a laminate, water jet cutting and the like are employed instead of the laser fusing, but when the above-mentioned laminate is cut by those cutting methods, the cut surface of the glass sheet is formed into an uneven surface (rough surface) having a small defect such as breaking and chipping. Further, the cut surface of the resin sheet is also formed into an uneven surface (rough surface) due to, for example, melting caused by a thermal effect at the time of laser irradiation, or due to roughening caused by abrasive grains at the time of water jet cutting. As long as the cut surface having such surface property is left standing, there is an extremely high risk of a critical problem with the quality of a product having the laminate built therein, such as breaking of the glass sheet that is generated at a point starting from the small defect. Therefore, it can be said that a process of finishing the cut surface of the laminate (glass sheet and resin sheet) is preferably executed after the above-mentioned laminate is cut into a predetermined shape and dimensions.

In this case, when the end edge portions of the glass sheet and the resin sheet are ground at the same time, it is considered that the processing efficiency of finishing can be enhanced. However, the inventors of the present invention found that those methods were liable to cause the following problems.

When the glass sheet and the resin sheet are ground at the same time with a grinding tool such as a diamond tool, a part of the grinding surface of the grinding tool (portion for grinding an object to be processed), which is brought into contact with the resin sheet, is liable to be clogged earlier for such a reason that the resin is a highly viscous material. When the grinding is continued under a state in which the clogging occurs, the resin sheet cannot be shaved off in a predetermined manner, and hence large fibrous resin chips are liable to be generated due to thermal deformation of the resin sheet that is caused by friction between the resin sheet and the grinding tool. The large resin chips are not easily discharged to the outside of the processing point, and hence the glass sheet is compressed by the generated resin chips. As a result, the damage to the glass sheet and the like are liable to occur.

In order to avoid the above-mentioned problems to the extent possible, it is considered that measures of decreasing the grinding efficiency (decreasing the feed speed of the grinding tool), increasing the maintenance or replacement frequency of the grinding tool, and the like only need to be taken. Even when any of those measures are taken, however, the processing efficiency is decreased significantly.

The present invention has been made in view of the above-mentioned circumstances, and it is therefore a third technical object thereof to provide a processing technology capable of efficiently finishing, with a predetermined accuracy, a cut surface of a laminate obtained by integrally laminating a glass sheet on a resin sheet.

<Fourth Technical Object>

Further, when the inventors of the present invention carried out laser fusing on a laminate obtained by integrally laminating glass sheets on both surfaces of a resin sheet to divide the laminate into a product portion and a non-product portion, a small defect such as a microcrack was in some cases formed in the cut end surface of the glass sheet that formed the product portion. Such trouble occurred similarly when the laser fusing was carried out on a glass sheet alone or a laminate obtained by integrally laminating a glass sheet on only one surface of a resin sheet. In particular, when the laser fusing was carried out on a glass sheet that was thinned to a thickness of about several hundreds of micrometers or less (or a laminate including the glass sheet), the frequency of formation of the small defect was increased more significantly. Therefore, the inventors of the present invention conducted extensive studies and found as a result that the small defect was liable to be formed in the cut end surface of the product portion in a case where the manner of supporting the brittle sheet-like object during the execution of the laser fusing was not appropriate, in particular, in a case where, in the brittle sheet-like object, the non-product portion (or a region to be formed into the non-product portion) was located even slightly higher than the product portion (or a region to be formed into the product portion). An overview of the inventors' findings is described with reference to FIGS. 39a and 39b.

FIG. 39a schematically illustrates a state immediately before a laminate 100 obtained by integrally laminating glass sheets 102 on both surfaces of a resin sheet 101 is divided into a product portion 100a and a non-product portion 100b through the laser fusing. The laminate 100 is supported in a horizontal posture by a support member 110 arranged on a bottom side thereof. The support member 110 includes a first support section 111 capable of supporting (in contact) the product portion 100a (or a region to be formed into the product portion 100a), and a second support section 112 capable of supporting (in contact) the non-product portion 100b (or a region to be formed into the non-product portion 100b). A part or all of a support surface of the second support section 112 is located slightly higher than a support surface of the first support section 111, and hence the support member 110 has a region in which a small gap is formed between a lower surface of the product portion 100a and the support surface of the first support section 111. Further, when the small gap is formed particularly in a region including a completion point of the laser fusing, immediately before the laser fusing is completed (see FIG. 39b), the product portion 100a of the laminate 100 drops due to a self-weight thereof or the like by an amount corresponding to a gap width of the above-mentioned small gap, with the result that the lower glass sheet 102 is forcibly snapped. Thus, a small defect 120 such as a microcrack is formed in the lower glass sheet 102 that forms the product portion 100a, and in the worst case, the lower glass sheet 102 that forms the product portion 100a is broken due to the small defect 120.

The above-mentioned problems may arise similarly in a case where a glass sheet alone that is the brittle sheet-like object is divided into the product portion and the non-product portion through so-called laser cleaving.

The present invention has been made in view of the above-mentioned circumstances, and it is therefore a fourth technical object thereof to optimize a manner of supporting a brittle sheet-like object when dividing the brittle sheet-like object into a product portion and a non-product portion through laser irradiation along a preset cutting line, thereby reducing, to the extent possible, a risk in that a small defect is formed in an end surface or the like of the product portion along with the division of the brittle sheet-like object into the product portion and the non-product portion.

Solution to Problems

<First Invention>

According to a first invention devised to achieve the above-mentioned first technical object, there is provided a laminate, comprising: a resin sheet; and a glass sheet having a thickness of 300 μm or less, the glass sheet being integrally laminated on at least one of both surfaces of the resin sheet, wherein an end surface of the glass sheet is chamfered. Note that, the resin sheet and the glass sheet herein encompass those having a thin film-like shape (hereinafter referred to simply as "films") (the same applies hereinafter).

According to this structure, the end surface of the glass sheet of the laminate is chamfered, and hence an angular portion is cut off from the end surface of the glass sheet. As a result, even when another member strikes against the end surface of the glass sheet, stress concentration occurring in the end surface of the glass sheet is relieved, and thus the damage to the end surface of the glass sheet and the separation that may occur between the glass sheet and the resin sheet can be prevented to the extent possible.

In the above-mentioned structure, it is preferred that at least a part of an end surface of the resin sheet protrude with respect to the end surface of the glass sheet.

With this structure, even if there occurs such a situation that another member is brought into contact with the end surface of the laminate, the another member is preferentially brought into contact with the end surface of the resin sheet that protrudes with respect to the end surface of the glass sheet, and hence the another member is not easily brought into direct contact with the end surface of the glass sheet. As a result, the damage to the end surface of the glass sheet and the separation that may occur between the glass sheet and the resin sheet can be prevented more reliably.

In the above-mentioned structure, it is preferred that the glass sheet be integrally laminated on each of both the surfaces of the resin sheet.

With this structure, each outermost layer of the laminate is formed of glass, and hence the durability or the like of the laminate can be enhanced reliably. Further, in a case where the glass sheet is integrally laminated on only one surface of the resin sheet, a warp of the laminate caused by a change in ambient temperature may become conspicuous due to a difference in thermal expansion between the resin sheet and the glass sheet. Therefore, also from the viewpoint of preventing such a warp, it is preferred that the glass sheet be integrally laminated on each of both the surfaces of the resin sheet.

In the above-mentioned structure, it is preferred that a corner portion formed by crossing adjacent two edges have a curved shape or a polygonal shape obtained by combining obtuse angles. Note that, the curved shape means that the corner portion is smoothly and continuously formed into a substantially arc-like shape.

According to this structure, the corner portion of the laminate does not have an acute angle portion of 90° or less. Therefore, even when the ambient temperature of the laminate is changed abruptly, the stress concentration occurring in the corner portion is relieved, and hence the glass sheet and the resin sheet are not easily separated from each other.

In the above-mentioned structure, it is preferred that a deformed portion formed of a projecting portion or a depressed portion be formed on an outer periphery of the laminate, and when the deformed portion comprises a bending portion, the bending portion have a curved shape. Note that, the curved shape means that the bending portion is smoothly and continuously formed into a substantially arc-like shape.

According to this structure, the bending portion formed in the projecting portion or the depressed portion on the outer periphery of the laminate does not have an acute angle. Therefore, even when the ambient temperature of the laminate is changed abruptly, the stress concentration acting on the bending portion is relieved, and the glass sheet is not easily damaged.

In the above-mentioned structure, it is preferred that an opening portion be formed in a flat surface of the laminate, the opening portion comprise a bending portion on a periphery thereof, and the bending portion have a curved shape. Note that, the curved shape means that the bending portion is smoothly and continuously formed into a substantially arc-like shape.

According to this structure, the bending portion formed in the opening portion of the laminate does not have an acute angle. Therefore, even when the ambient temperature of the laminate is changed abruptly, the stress concentration acting on the bending portion is relieved, and the glass sheet is not easily damaged.

According to the first invention devised to achieve the above-mentioned first technical object, there is provided a manufacturing method for a laminate, comprising: a lamination step of integrally laminating a glass sheet having a thickness of 300 µm or less on at least one of both surfaces of a resin sheet; and a chamfering step of chamfering an end surface of the glass sheet that is integrally laminated on the resin sheet in the lamination step.

That is, in a case of chamfering an end surface of a glass sheet having a thickness of 300 µm or less, the glass sheet alone is liable to be damaged, and it is extremely difficult to chamfer the end surface thereof with a grinding wheel or the like. In contrast, according to the above-mentioned method, the end surface of the glass sheet is chamfered after the glass sheet is integrally laminated on the resin sheet. Thus, as compared to the case of the glass sheet alone, the effect of reinforcing the glass sheet with the resin sheet is expected, and hence the end surface of the glass sheet can be chamfered easily.

In the above-mentioned structure, the chamfering step may comprise chamfering the resin sheet as well.

With this structure, it can be expected that the strength against the damage is further enhanced in the entire laminate.

In the above-mentioned structure, the lamination step may comprise integrally laminating the glass sheet on each of both the surfaces of the resin sheet.

<Second Invention>

According to a second invention devised to achieve the above-mentioned first technical object, there is provided a laminate, comprising: a resin sheet; and glass sheets having a thickness of 300 µm or less, the glass sheets being integrally laminated on both surfaces of the resin sheet, wherein at least apart of an end surface of the resin sheet protrudes with respect to end surfaces of the glass sheets.

According to this structure, at least the part of the end surface of the resin sheet actively protrudes with respect to the end surfaces of the glass sheets, and hence, for example, even in a case where another member is laterally brought into contact with the laminate, the another member is preferentially brought into contact with the end surface of the resin sheet relative to the end surfaces of the glass sheets. Therefore, it is possible to reduce such a situation that another member is brought into direct contact with the end surfaces of the glass sheets. Further, even if thermal contraction occurs in the resin sheet, at least the part of the end surface of the resin sheet protrudes in advance, and hence it is also possible to avoid such a situation that the end surfaces of the glass sheets protrude with respect to the end surface of the resin sheet. Thus, it is possible to reliably reduce such a situation that the glass sheet is damaged or separated at a point starting from the end surface thereof due to the contact between the laminate and the another member.

In the above-mentioned structure, each of the end surfaces of the glass sheets may comprise a tapered surface inclined away from the end surface of the resin sheet toward an outer surface side of each of the glass sheets.

With this structure, the end surfaces of the glass sheets are gradually spaced away from the end surface of the resin sheet toward the outer surface side of the glass sheets, and hence it is possible to more reliably reduce the probability that another member is brought into contact with the end surfaces of the glass sheets.

In the above-mentioned structure, the resin sheet and the glass sheets may be adhered to each other with adhesive layers.

With this structure, the glass sheets can be fixed to the resin sheet easily and reliably.

In the above-mentioned structure, end surfaces of the adhesive layers may protrude with respect to the end surfaces of the glass sheets.

With this structure, the adhesive layers are larger in size than the glass sheets, and hence the adhesive layers reliably act on the entire surfaces of the glass sheets, thus leading to a preferred manner also from the viewpoint of preventing the separation of the glass sheets.

In the above-mentioned structure, the end surfaces of the glass sheets and the end surface of the resin sheet may be formed continuous with each other into a projecting curved surface.

With this structure, at least the part of the end surface of the resin sheet can easily protrude with respect to the end surfaces of the glass sheets while also chamfering the end surfaces of the glass sheets.

<Third Invention>

According to a third invention devised to achieve the above-mentioned second technical object, there is provided a cutting method for a laminate, comprising carrying out laser fusing by irradiating the laminate with a laser beam from one side thereof, the laminate being obtained by integrally laminating glass sheets on both surfaces of a resin sheet, the laser beam having a focal point adjusted inside the laminate at a position that is set within a range of more than 50% and 90% or less of an overall thickness of the laminate from an incident surface side of the laser beam.

The inventors of the present invention conducted extensive studies and found as a result that the position of the focal point of the laser beam was important to set an appropriate amount of heat when carrying out the laser fusing on the laminate. That is, it seems that the laminate can be cut efficiently when the position of the focal point of the laser beam is set to a center of the laminate in a thickness direction thereof, but in this case, there arose a problem in that the glass sheet located opposite to the incident side of the laser beam (the glass sheet located on the incident side of the laser beam is hereinafter referred to also as "incident-side glass sheet", and the glass sheet located opposite to the incident side of the laser beam is hereinafter referred to also as "non-incident-side glass sheet") was not cut. The reason is considered that molten foreign matter generated at the time of cutting inhibits the propagation of the laser beam and the heat is not easily transferred to the non-incident-side glass sheet. The molten foreign matter herein refers to foreign matter such as dross, which is generated along with fusing of the glass sheets and the resin sheet, and encompasses both foreign matter in a molten state and foreign matter in a solid state.

Note that, it is considered that the power of the laser beam be increased under a state in which the position of the focal point of the laser beam is set to the center, but in this case, an excessive amount of heat is applied to the incident-side glass sheet and a part of the resin sheet in the vicinity of the incident-side glass sheet, which may cause such a situation that a crack is generated in the cut surface of the incident-side glass sheet or the resin sheet is ignited.

Therefore, in the present invention, as in the above-mentioned structure, the position of the focal point of the laser beam is set within the range of more than 50% and 90% or less of the overall thickness of the laminate from the incident surface side of the laser beam. Thus, the position of the focal point of the laser beam is located closer to the non-incident-side glass sheet, and hence a sufficient amount of heat is also transferred toward the non-incident-side glass sheet, with the result that the non-incident-side glass sheet can also be cut accurately. In this case, the reason why the upper limit value, that is, 90% or less of the overall thickness is provided to the position of the focal point of the laser beam is that, when the value exceeds the upper limit value, conversely, the heat of the laser beam is not easily transferred toward the incident-side glass sheet, which may cause cutting failure.

In the above-mentioned structure, it is preferred that the position of the focal point be set within a range of 60% or more and 80% or less of the overall thickness of the laminate from the incident surface side of the laser beam.

With this structure, the heat of the laser beam can be transferred more efficiently to all of the three sheets, that is, the incident-side glass sheet, the resin sheet, and the non-incident-side glass sheet.

In the above-mentioned structure, a value obtained by dividing power of the laser beam by scanning speed of the laser beam may be set to 0.001 to 1 W·min/mm. In this case, in a case where the laser beam used in the laser fusing is, for example, a pulsed laser, an expression of "laser power=peak power×(pulse width/pulse period)" is established. Further, the scanning speed of the laser beam refers to relative speed between the laminate and the laser beam.

With this structure, the amount of heat of the laser beam to be applied to the irradiation point of the laser beam is optimized, and hence the cutting of the laminate can be achieved more accurately.

In the above-mentioned structure, it is preferred that the resin sheet have a thickness of 20 mm or less, the glass sheets have a thickness of 300 μm or less, and the resin sheet be thicker than the glass sheets.

<Fourth Invention>

According to a fourth invention devised to achieve the above-mentioned third technical object, there is provided a processing method for a laminate, comprising: a cutting step of cutting the laminate obtained by integrally laminating a glass sheet on at least one of both surfaces of a resin sheet; and a finishing step of finishing a cut surface of the laminate that is formed in the cutting step, the finishing step comprising: a first phase of processing a cut surface of the glass sheet by grinding, and leaving at least a part of a cut surface of the resin sheet in an unprocessed state; and a second phase of processing only the cut surface of the resin sheet that is left in the unprocessed state. Note that, the operation of "finishing a cut surface of the laminate" herein refers to an operation of, for example, cutting off the end portion including the cut surface by predetermined dimensions, to thereby finish the cut surface of the laminate into a smooth surface having no small defect or the like (or finish the cut surface of the laminate into a surface to the extent that, even if the small defect is formed, the small defect causes no problem with the quality).

As described above, when finishing the cut surface of the laminate, the first phase is first executed to process (finish) the cut surface of the glass sheet by grinding, and to leave at least the part of the cut surface of the resin sheet in the unprocessed state. With this method, when grinding the cut surface of the glass sheet (end portion including the cut surface), large resin chips are not easily generated, and in addition, the resin sheet functions as a backup member for the glass sheet so that the glass sheet is not easily distorted when a grinding tool is pressed against the cut surface of the glass sheet. From the facts described above, when executing the grinding in the first phase, trouble such as breaking and chipping of the glass sheet can be prevented to the extent possible while increasing the feed speed of the grinding tool so as to enhance the finishing efficiency of the glass sheet. Further, in the second phase subsequent to the first phase of the finishing step, only the cut surface of the resin sheet that is left in the unprocessed state is processed (finished). Thus, a processing method suited to finish the resin can be selected for use, and hence the cut surface of the resin sheet can be finished efficiently. As described above, in the present invention, the finishing of the cut surface of the laminate, which may be completed even in a single phase, is executed in two separate phases intendedly. Therefore, it seems that the man-hours and cost required to finish the cut surface are increased, but the amount of processing efficiency enhanced by employing the present invention is larger than the amount of processing efficiency decreased due to the above-mentioned problems that may arise in the case of employing the conventional methods. Thus, according to the present invention, the cut surface of the laminate obtained by integrally laminating the glass sheet on the resin sheet can be finished efficiently.

Note that, in the grinding to be executed in the first phase, from the viewpoint of preventing the clogging of the grinding tool and therefore preventing the breaking of the glass sheet due to the clogging to the extent possible, it is desired to process only the cut surface of the glass sheet. However, it is not easy to grind only the cut surface of the glass sheet without grinding any part of the cut surface of the resin sheet, and when such grinding is to be achieved, it is necessary to manage and control grinding conditions with extreme precision, thus leading to a risk of increase in processing cost on the contrary. Therefore, in the first phase in which the grinding is executed, at least the part of the cut surface of the resin sheet is left in the unprocessed state. Conversely, a part of the cut surface of the resin sheet is allowed to be ground in the first phase. Thus, the grinding conditions in the first phase can be relaxed, and the grinding can be executed rapidly. Note that, it is important that the grinding range for the cut surface of the resin sheet be limited to a range in which large resin chips are not generated even when the resin sheet is ground, in other words, a range in which the grinding tool is not clogged (is not easily clogged).

In the above mentioned structure, it is desired that the grinding in the first phase is executed (progressed) under a state in which a grinding tool is brought into contact with a surface to be processed (cut surface of the glass sheet, or the cut surface of the glass sheet and a part of the cut surface of the resin sheet) at a constant contact force.

With this structure, an excessive pressure is not easily applied to the glass sheet during the grinding, and hence the glass sheet is not easily broken. Therefore, the feed speed of the grinding tool can be increased so as to enhance the processing efficiency of the first phase in the finishing step.

In the above-mentioned structure, the grinding in the first phase may be executed a plurality of times through use of grinding tools having different surface roughnesses (grit sizes) of grinding surfaces thereof.

With this structure, the cut surface of the glass sheet is easily finished in a more rapid manner as compared to the case of executing the first phase through use of a single grinding tool. When taking a specific example, first, the surface to be processed is roughly ground through use of a first grinding tool having a relatively larger surface roughness of the grinding surface (having a relatively smaller grit size), and then the surface to be processed is precisely ground through use of a second grinding tool having a relatively smaller surface roughness of the grinding surface (having a relatively larger grit size). In this case, the surface to be processed can be precisely finished in the phase of grinding through use of the second grinding tool while securing a necessary and sufficient grinding amount by the grinding through use of the first grinding tool. Thus, the surface to be processed can be finished efficiently. As a matter of course, the grinding in the first phase may be executed through use of three or more types of grinding tool.

In the above-mentioned structure, the second phase may comprise processing, by cutting work, only the cut surface of the resin sheet that is left in the unprocessed state.

The cutting work is executed through use of a working tool such as a so-called end mill, in which the distance between adjacent blade portions is large so that the working tool is not easily clogged. Thus, the feed speed of the working tool can be increased so as to finish the cut surface of the resin sheet efficiently. In particular, of the cutting tools, a so-called non-coated cutting tool having no protective coating formed on a surface thereof has blade portions (cutting edges) exposed in a sharp state without being covered with the protective coating, and hence the sharpness for cutting a resin is more satisfactory as compared to a so-called coated cutting tool. Thus, when the cut surface of the resin sheet is processed through use of the non-coated cutting tool, the cut surface of the resin sheet may be finished particularly efficiently.

The processing method according to the present invention described above is particularly suited to finish the cut surface of the laminate in which the glass sheet alone has a thickness of 0.01 mm or more and 0.7 mm or less. This is because the breaking, chipping, and the like are liable to occur particularly in the thin glass sheet described above.

Further, the processing method according to the present invention described above is also suited to finish the cut surface of the laminate in which the thickness of the glass sheet alone is smaller than a thickness of the resin sheet. This is because the problems inherent in the above-mentioned conventional methods are more conspicuous when finishing a cut surface of a laminate obtained by integrally laminating a relatively thinner glass sheet on a relatively thicker resin sheet.

<Fifth Invention>

According to a fifth invention devised to achieve the above-mentioned fourth technical object, there is provided a cutting apparatus for a brittle sheet-like object, which is configured to cut a preset cutting line of the brittle sheet-like object, which is supported in a horizontal posture from a bottom side thereof by a support member, by radiating a laser beam along the preset cutting line so as to divide the brittle sheet-like object into a product portion and a non-product portion across the preset cutting line, the support member comprising: a first support section capable of supporting the product portion; and a second support section capable of supporting the non-product portion, wherein a support surface of the first support section is located higher than a support surface of the second support section.

As described above, of the first and second support sections provided in the support member, the support surface of the first support section is located higher than the support surface of the second support section. Thus, the work of radiating the laser beam, that is, the work of cutting the preset cutting line can be progressed and completed under a state in which the product portion (or the region to be formed into the product portion) is located constantly higher than the non-product portion (or the region to be formed into the non-product portion). Therefore, it is possible to reduce, to the extent possible, the risk in that a small defect such as a microcrack is formed in the cut end surface of the product portion (end surface formed along with the division of the brittle sheet-like object into the product portion and the non-product portion across the preset cutting line through the cutting of the preset cutting line; the same applies hereinafter) in the phase immediately before the completion of the cutting of the preset cutting line due to the fact that the product portion is located lower than the non-product portion.

Note that, when the support surfaces of both the support sections are provided at the same height, as compared to the case where the support surface of the first support section is located lower than the support surface of the second support section, the risk of formation of the small defect in the cut end surface of the product portion may be reduced to the extent possible. However, a processing error at the time of manufacturing the support member is not easily eliminated in a complete manner, and when a support member in which the support surfaces of both the support sections are provided at the same height is to be obtained while eliminating the processing error in a complete manner, considerable man-hours and cost are required to manufacture the support member. Further, the respective sections of the support member are thermally deformed due to the irradiation heat of the laser beam or the like, with the result that a small height difference may also be generated between the support surfaces of both the support sections during the execution of the cutting process. Still further, when the heights of the support surfaces of both the support sections are set equal to each other, it is not determined whether the above-mentioned small defect is generated in the cut end surface of the product portion or the cut end surface of the non-product portion. In contrast, according to the above-mentioned structure of the present invention, the above-mentioned small defect is reliably generated in the cut end surface of the non-product portion, and hence those problems can be solved to the extent possible, which is advantageous in terms of the manufacturing cost of the support member and the quality of the product.

In the above-mentioned structure, the support surface of the first support section may be located higher than the support surface of the second support section within a range of 0.01 mm or more and 0.2 mm or less.

When the cutting of the preset cutting line is completed under the state in which the product portion is located higher than the non-product portion, as described above, it is possible to reduce, to the extent possible, the risk in that the small defect is formed in the cut end surface of the product portion. However, when the height difference between both the support surfaces is extremely small, it is hard to deny a risk in that a part or all of the support surface of the first support section is located lower than the support surface of the second support section due to effects of the processing error at the time of manufacturing the support member and/or thermal deformation of the support sections along with the irradiation with the laser beam. Therefore, when the support surface of the first support section is located higher by 0.01 mm or more than the support surface of the second support section, the height difference can absorb the amount of the processing error at the time of manufacturing the support member and the amount of the thermal deformation of the support sections along with the irradiation with the laser beam. In a case where the support surface of the first support section is located higher by more than 0.2 mm than the support surface of the second support section, on the other hand, the amount of hanging down the non-product portion due to a self-weight thereof becomes larger, and due to a bending stress generated therefrom, there is a risk in that the small defect is formed in the product portion (and further, the product portion is broken). As described above, it is desired that the support surface of the first support section be located higher than the support surface of the second support section within the range of 0.01 mm or more and 0.2 mm or less.

In the above-mentioned structure, the cutting apparatus further comprise an elevating mechanism for raising and lowering at least one of the first support section and the second support section.

With this structure, during the execution of the cutting process for the preset cutting line, the heights of the support surfaces of both the support sections can be adjusted, and hence the cutting of the preset cutting line is easily progressed and completed under a state in which the respective portions of the brittle sheet-like object are held in an optimum posture.

The above-mentioned cutting apparatus may be used suitably when the brittle sheet-like object is a laminate obtained by integrally laminating a glass sheet on at least one of both surfaces of a resin sheet. In particular, the cutting apparatus may be used suitably when a laminate obtained by using the glass sheets each having a thickness of 0.01 mm or more and 1.0 mm or less, and the resin sheet having a thickness of 0.01 mm or more and 10 mm or less is to be divided into the product portion and the non-product portion.

Further, the above-mentioned cutting apparatus may also be used suitably when the brittle sheet-like object is a glass sheet. In particular, the cutting apparatus may be used suitably when the glass sheet having a thickness of 0.01 mm or more and 1.0 mm or less is to be divided into the product portion and the non-product portion.

According to the fifth invention devised to achieve the above-mentioned fourth technical object, there is provided a cutting method for a brittle sheet-like object, comprising cutting a preset cutting line of the brittle sheet-like object, which is supported in a horizontal posture from a bottom side thereof by a support member, by radiating a laser beam along the preset cutting line so as to divide the brittle sheet-like object into a product portion and a non-product portion across the preset cutting line, the cutting of the preset cutting line being completed under a state in which the product portion is located higher than the non-product portion, the state being achieved at least immediately before completion of the cutting of the preset cutting line.

According to this structure, it is possible to obtain the same actions and effects as those in the case of employing the above-mentioned cutting apparatus for a brittle sheet-like object.

In the above-mentioned structure, the product portion and the non-product portion may be located at the same height during a period after start of the cutting of the preset cutting line until immediately before the completion of the cutting of the preset cutting line.

With this structure, the cutting of the preset cutting line can be progressed under a state in which the product portion and the non-product portion are located within the same plane. Thus, it is possible to reduce, to the extent possible, the probability of formation of the small defect caused by the product portion or the non-product portion that is hung down due to the self-weight thereof.

The above-mentioned structure may be employed particularly suitably when cutting the preset cutting line by melting and removing the preset cutting line due to irradiation heat of the laser beam, that is, when dividing the brittle sheet-like object into the product portion and the non-product portion by so-called laser fusing.

Advantageous Effects of Invention

As described above, according to the first invention and the second invention, it is possible to reduce, to the extent possible, such a situation that the end surface of the glass sheet is damaged and the glass sheet and the resin sheet are separated from each other.

Further, according to the third invention, it is possible to set an appropriate amount of heat of the laser fusing by optimizing the position of the focal point of the laser beam inside the laminate, thereby accurately cutting the laminate.

Further, according to the fourth invention, it is possible to efficiently finish, with a predetermined accuracy, the cut surface of the laminate obtained by integrally laminating the glass sheet on the resin sheet.

Further, according to the fifth invention, it is possible to optimize the manner of supporting the brittle sheet-like object when dividing the brittle sheet-like object into the product portion and the non-product portion through the laser irradiation along the preset cutting line, thereby reducing, to the extent possible, the risk in that the small defect is formed in the cut end surface of the product portion along with the division of the brittle sheet-like object into the product portion and the non-product portion.

BRIEF DESCRIPTION OF DRAWINGS

FIG. 11 is a table showing results of an evaluation test according to [Example 1].

FIG. 12 is a plan view illustrating a laminate according to a tenth embodiment of the present invention.

FIG. 13 is a plan view illustrating a laminate according to an eleventh embodiment of the present invention.

FIG. 14 is a table showing results of an evaluation test according to [Example 2].

FIG. 15 is an explanatory view illustrating a problem inherent in a conventional laminate.

FIG. 16 is a plan view illustrating a laminate according to a twelfth embodiment of the present invention.

FIG. 17 is a table showing results of an evaluation test according to [Example 3].

FIG. 18 is an explanatory view illustrating a problem inherent in another conventional laminate.

FIG. 19 is a plan view illustrating a laminate according to a thirteenth embodiment of the present invention.

FIG. 20 is a table showing results of an evaluation test according to [Example 4].

FIG. 34a is a schematic plan view illustrating a cutting apparatus for a brittle sheet-like object according to a twenty-first embodiment of the present invention.

FIG. 34b is a schematic sectional view taken on the arrows X-X in FIG. 34a.

FIG. 34c is a schematic plan view illustrating a state in which the brittle sheet-like object is divided into a product portion and a non-product portion through use of the cutting apparatus illustrated in FIGS. 34a and 34b.

DESCRIPTION OF EMBODIMENTS

Now, embodiments of the present invention (first to fifth inventions) are described with reference to the accompanying drawings.

First Embodiment

Figure 1:
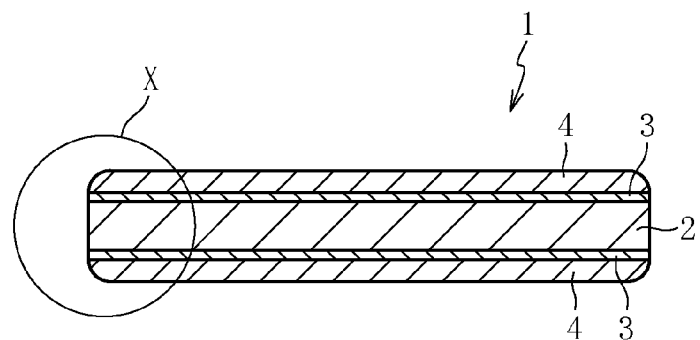
FIG. 1 is a sectional view illustrating a laminate according to a first embodiment of the present invention.

As illustrated in FIG. 1, a laminate 1 according to a first embodiment of the present invention comprises a resin sheet 2 and glass sheets 4 that are integrally laminated on both surfaces of the resin sheet 2 with adhesive layers 3, respectively. For example, the laminate 1 is used for a cover member of a touch panel of a portable electronic device. Note that, the adhesive layers 3 may be omitted and the resin sheet 2 may be adhered directly to the glass sheets 4 by welding or the like. Further, the glass sheet 4 may be integrally laminated on only one of both surfaces of the resin sheet 2.

As the resin sheet 2, for example, a resin sheet having a thickness of 0.01 mm or more and 20 mm or less (preferably 0.01 mm or more and 10 mm or less) is used, and in the case where the laminate 1 is used for a cover member of a touch panel to be mounted to a portable electronic device or the like, the thickness of the resin sheet 2 is preferably 0.1 mm or more and 3 mm or less (in particular, 0.1 mm or more and 2 mm or less). As a material for the resin sheet 2, for example, various kinds of resin material may be used, such as polycarbonate, acrylic, polyethylene terephthalate, PEEK, polyamide, polyvinyl chloride, polyethylene, polypropylene, and polyethylene naphthalate. In this case, the resin sheet 2 encompasses a resin film (the same applies hereinafter).

As the glass sheet 4, for example, a glass sheet having a thickness of 0.01 mm or more and 0.7 mm or less is used. In the case where the laminate 1 is used for a cover member of a touch panel or the like, the thickness of the glass sheet 4 is preferably 0.01 mm or more and 0.5 mm or less, more preferably 0.01 mm or more and 0.3 mm or less (in particular, 0.01 mm or more and 0.2 mm or less). Note that, it is preferred that the glass sheet 4 be thinner than the resin sheet 2. As a composition of the glass sheet 4, various kinds of glass may be used, and alkali-free glass is preferred. This is because, in the case of glass containing an alkaline component as the composition, the alkaline component contained in the glass is lost over time, and when a bending stress is applied to the laminate, the glass sheet is liable to break at a point starting from the portion in which the alkaline component is lost. In this case, the glass sheet 4 encompasses a glass film (the same applies hereinafter).

Note that, the thickness of the adhesive layer 3 is, for example, about 0.001 to 2.0 mm. In the case where the laminate 1 is used for a cover member of a touch panel or the like, the thickness of the adhesive layer is preferably 0.01 mm or more and 0.5 mm or less, more preferably 0.01 mm or more and 0.3 mm or less, further preferably 0.01 mm or more and 0.1 mm or less. As a material for the adhesive layer 3, for example, there may be used an acrylic pressure sensitive adhesive, a silicone pressure sensitive adhesive, a rubber pressure sensitive adhesive, an ultraviolet curable acrylic adhesive, an ultraviolet curable epoxy adhesive, a thermosetting epoxy adhesive, a thermosetting melamine adhesive, a thermosetting phenolic adhesive, an ethylene-vinyl acetate (EVA) interlayer, and a polyvinyl butyral (PVB) interlayer.

Figure 2:
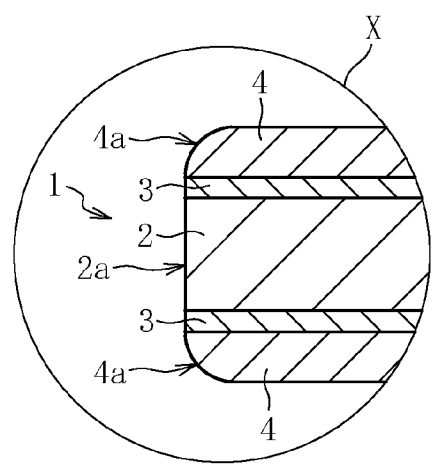
FIG. 2 is an enlarged view illustrating the region X in FIG. 1.

As illustrated in an enlarged view of FIG. 2, the structure of the laminate 1 has a feature in that an end surface 4a of the glass sheet 4 integrally laminated on the resin sheet 2 comprises a processed surface obtained by chamfering. Note that, in the example of FIG. 2, an end surface 2a of the resin sheet 2 is not chamfered.

Specifically, the end surface 4a of the glass sheet 4 is roundly chamfered (subjected to round chamfering) into a substantially arc-like shape (for example, an arc corresponding to a quarter of a circle with a single curvature and an arc corresponding to one-eighth of a circle with a single curvature). With this structure, an angular portion is cut off from the end surface 4a of the glass sheet 4. As a result, even when another member strikes against the end surface 4a of the glass sheet 4, the stress generated in the end surface 4a of the glass sheet 4 is dispersed and relieved to prevent stress concentration. Thus, damage to the end surface 4a of the glass sheet 4 and separation between the glass sheet 4 and the resin sheet 2 can be prevented to the extent possible.

Next, a manufacturing method for the above-mentioned laminate 1 is described.

First, the glass sheets 4 are integrally laminated on both surfaces of the resin sheet 2 through an intermediation of the adhesive layers 3 made of an adhesive. Subsequently, the end surface 4a of each glass sheet 4 integrally laminated on the resin sheet 2 is chamfered. The chamfering is carried out by mechanically grinding the end surface 4a of the glass sheet 4 with a grinding wheel. In this case, for the glass sheet 4 having a thickness of 300 μm or less alone, when the end surface 4a is mechanically ground with the grinding wheel, damages such as chipping and breaking are liable to occur in the end surface 4a of the glass sheet 4. In contrast, in the above-mentioned manufacturing method, the glass sheet 4 is reinforced with the resin sheet 2, and then the end surface 4a of the glass sheet 4 is chamfered. Thus, the end surface 4a of the glass sheet 4 can be mechanically ground with the grinding wheel while preventing the damage to the glass sheet 4.

In this case, as the method of chamfering the end surface 4a of the glass sheet 4 other than the above-mentioned method, for example, there may be employed a method that involves stacking a plurality of glass sheets 4 having a thickness of 300 μm or less, adhering their surfaces to each other (into close contact with each other) through optical contact without using the adhesive, and chamfering, in this lamination state, the end surface of each glass sheet 4 with the grinding wheel. In this case, a surface roughness Ra of the surface of the glass sheet 4 on the close-contact portion side is preferably 2.0 nm or less, particularly preferably 0.2 nm or less. With this structure, each glass sheet 4 is reinforced with the other glass sheets 4, and hence the glass sheet 4 can be prevented from being damaged at the time of chamfering. In this case, the glass sheets 4 subjected to the chamfering are integrally laminated on the resin sheet 2 with an adhesive or the like.

Further, instead of the mechanical grinding with the grinding wheel, the end surface 4a of the glass sheet 4 may be immersed into an etchant such as a hydrofluoric acid to chamfer the edge portion of the end surface 4a of the glass sheet 4. In this case, the glass sheet 4 subjected to the chamfering is integrally laminated on the resin sheet 2 with an adhesive or the like. As a matter of course, after the glass sheet 4 is integrally laminated on the resin sheet 2 with an adhesive or the like, the end surface of the laminate may be immersed into an etchant such as a hydrofluoric acid or applied with a plasma of a compound containing fluorine (for example, carbon tetrafluoride), to thereby chamfer the edge portion of the end surface 4a of the glass sheet 4.

In the above description, the laminate to be used for a protective cover of a touch panel is taken as an example, and as a matter of course, the present invention is also applicable to a laminate to be built into panels of various electric or electronic devices as typified by flat panel displays (FPDs), induction cookers, and solar cells, and further to a laminate to be built into window panels of building structures and various vehicles. Note that, the same applies hereinafter for the use of the laminate described above.

Second Embodiment

Figure 3:
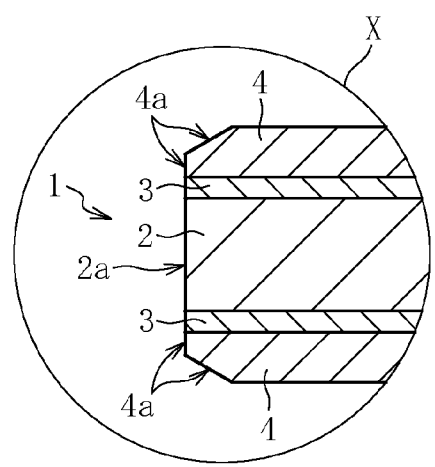
FIG. 3 is an enlarged sectional view illustrating a main part of a laminate according to a second embodiment of the present invention.

As illustrated in FIG. 3, a laminate 1 according to a second embodiment of the present invention is different from the laminate 1 according to the first embodiment in that the edge portion of the end surface 4a of the glass sheet 4 is cut off along a straight line (C-chamfering).

Specifically, the end surface 4a of the glass sheet 4 is chamfered by cutting off, along the straight line, an edge portion (triangular portion) formed at a part connecting the end surface 4a of the glass sheet 4 and a surface of the glass sheet 4 on an outermost surface side (side on which the resin sheet 2 is not located) while a surface extending in a direction substantially perpendicular to the surface of the glass sheet 4 is left in the end surface 4a of the glass sheet 4. In this case, the angle formed at the part connecting the end surface 4a of the glass sheet 4 and the surface of the glass sheet 4 serving as the outermost surface is set to more than 90° (preferably 120° or more).

Note that, FIG. 3 illustrates the case where the edge portion of the end surface 4a of the glass sheet 4 is cut off along the straight line in such a manner that the surface extending in the direction substantially perpendicular to the surface of the glass sheet 4 is left in the end surface 4a of the glass sheet 4, but the edge portion of the end surface 4a of the glass sheet 4 may be cut off along the straight line in such a manner that the surface extending in the substantially perpendicular direction is not left. In other words, the end surface 4a of the glass sheet 4 may be formed only of a tapered surface.

Third Embodiment

Figure 4:
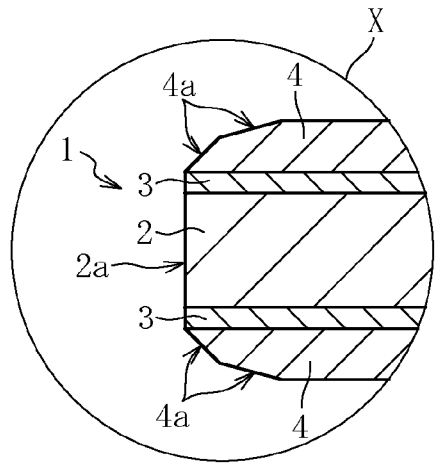
FIG. 4 is an enlarged sectional view illustrating a main part of a laminate according to a third embodiment of the present invention.

As illustrated in FIG. 4, a laminate 1 according to a third embodiment of the present invention is different from the laminates 1 according to the first and second embodiments in that the end surface 4a of the glass sheet 4 is chamfered into composite flat surfaces obtained by connecting a plurality of tapered surfaces having different inclination angles.

Fourth Embodiment

Figure 5:
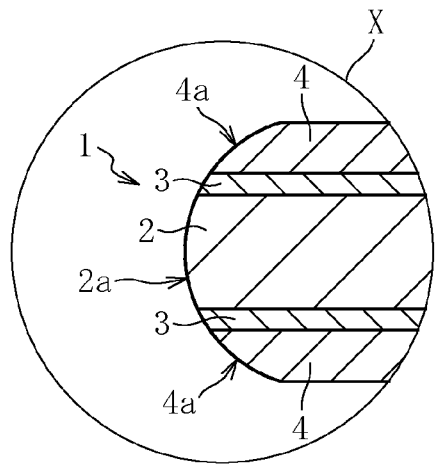
FIG. 5 is an enlarged sectional view illustrating a main part of a laminate according to a fourth embodiment of the present invention.

As illustrated in FIG. 5, a laminate 1 according to a fourth embodiment of the present invention is different from the laminates 1 according to the first to third embodiments in that the chamfering is carried out continuously over a range from the end surface 4a of the glass sheet 4 to the end surface 2a of the resin sheet 2.

Specifically, in this embodiment, the end surface 4a of the glass sheet 4 and the end surface 2a of the resin sheet 2 are chamfered continuously into a single arc surface. Note that, the single arc surface encompasses the shapes of not only a perfect circle but also a non-perfect circle such as an ellipse and a parabola.

Fifth Embodiment

Figure 6:
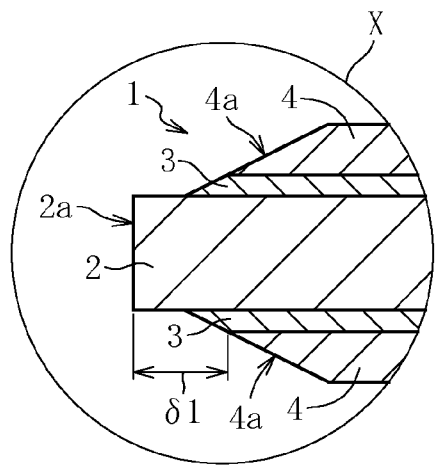
FIG. 6 is an enlarged sectional view illustrating a main part of a laminate according to a fifth embodiment of the present invention.

As illustrated in FIG. 6, a laminate 1 according to a fifth embodiment of the present invention is different from the laminates 1 according to the first to fourth embodiments in that the end surface 2a of the resin sheet 2 protrudes with respect to the end surface 4a of the glass sheet 4.

Specifically, in this embodiment, the entire end surface 4a of the glass sheet 4 is chamfered into an inclined surface, and the entire end surface 2a of the resin sheet 2 protrudes from a distal end of the end surface 4a of the glass sheet 4. Note that, the end surface 2a of the resin sheet 2 is not chamfered.

A protruding dimension δ1 of the end surface 2a of the resin sheet 2 with respect to the end surface 4a of the glass sheet 4 is set to, for example, about 0.01 to 5 mm. It is preferred that the protruding dimension δ1 be determined in consideration of a thermal expansion coefficient of the resin sheet 2 or a difference in thermal expansion between the resin sheet 2 and the glass sheet 4 and the areas of the flat surfaces of the resin sheet 2 and the glass sheet 4.

With this structure, even if there occurs such a situation that another member is brought into contact with the end surface of the laminate 1, the another member is preferentially brought into contact with the end surface 2a of the resin sheet 2 that protrudes with respect to the end surface 4a of the glass sheet 4, and hence the another member is not easily brought into direct contact with the end surface of the glass sheet 4. As a result, the damage to the end surface 4a of the glass sheet 4 and the separation between the glass sheet 4 and the resin sheet 2 can be prevented more reliably. Note that, this effect can be produced, despite some differences, as long as at least a part of the end surface 2a of the resin sheet 2 protrudes with respect to the end surface 4a of the glass sheet 4. That is, a similar effect can be produced also in the case where the region ranging from the end surface 4a of the glass sheet 4 to the end surface 2a of the resin sheet 2 is chamfered continuously into a substantially arc-like shape as in the manner described in the fifth embodiment.

Note that, in the case where at least apart (preferably the entire region) of the end surface 2a of the resin sheet 2 protrudes with respect to the end surface 4a of the glass sheet 4 in the manner described above, the chamfering of the end surface 4a of the glass sheet 4 may be omitted as appropriate.

Further, the end surface of the adhesive layer 3 may be located on the same plane as that of the end surface 4a of the glass sheet 4, or may protrude from the end surface 4a of the glass sheet 4. In the latter case, the adhesive layer 3 can reliably act on a region including the edge of the end surface 4a of the glass sheet 4, which is also suitable to prevent the separation of the glass sheet 4. In this case, the adhesive layer 3 extending beyond the end surface 4a of the glass sheet 4 may be routed toward the end surface 4a of the glass sheet 4 so that the adhesive layer 3 covers at least a part of the end surface 4a of the glass sheet 4.

Sixth Embodiment

Figure 7:
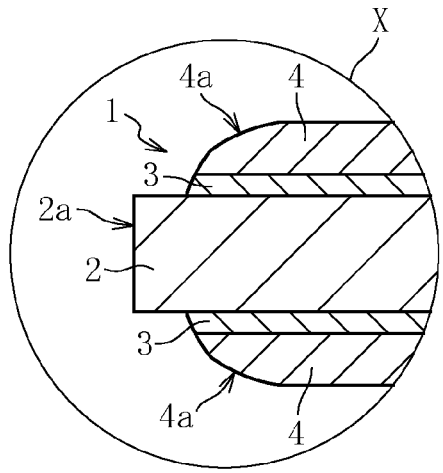
FIG. 7 is an enlarged sectional view illustrating a main part of a laminate according to a sixth embodiment of the present invention.

As illustrated in FIG. 7, a laminate 1 according to a sixth embodiment of the present invention is different from the laminate 1 according to the fifth embodiment in that the end surface 4a of the glass sheet 4 is chamfered into composite curved surfaces obtained by connecting a plurality of arc surfaces having different curvatures.

Seventh Embodiment

Figure 8:
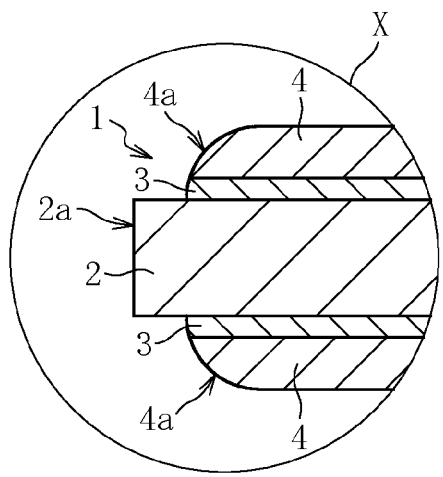
FIG. 8 is an enlarged sectional view illustrating a main part of a laminate according to a seventh embodiment of the present invention.

As illustrated in FIG. 8, a laminate 1 according to a seventh embodiment of the present invention is different from the laminates 1 according to the fifth and sixth embodiments in that the end surface 4a of the glass sheet 4 is chamfered into a single arc surface (for example, an arc corresponding to a quarter of a circle and an arc corresponding to one-eighth of a circle). Note that, the single arc surface encompasses the shapes of not only a perfect circle but also a non-perfect circle such as an ellipse and a parabola.

Eighth Embodiment

Figure 9:
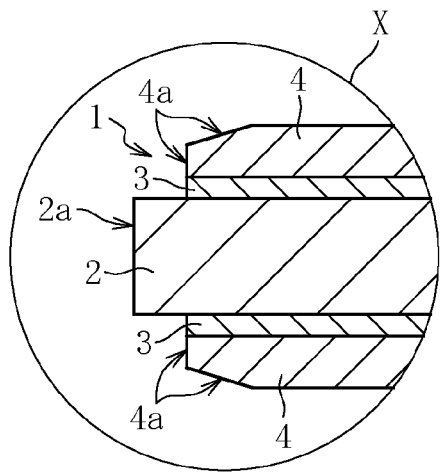
FIG. 9 is an enlarged sectional view illustrating a main part of a laminate according to an eighth embodiment of the present invention.

As illustrated in FIG. 9, a laminate 1 according to an eighth embodiment of the present invention is different from the laminates 1 according to the fifth to seventh embodiments in that the edge portion of the end surface 4a of the glass sheet 4 is cut off along a straight line (C-chamfering).

Specifically, the end surface 4a of the glass sheet 4 is chamfered by cutting off, along the straight line, an edge portion (triangular portion) formed at a part connecting the end surface 4a of the glass sheet 4 and a surface of the glass sheet 4 on an outermost surface side (side on which the resin sheet 2 is not located) while a surface extending in a direction substantially perpendicular to the surface of the glass sheet 4 is left in the end surface 4a of the glass sheet 4.

Note that, FIG. 9 illustrates the case where the edge portion of the end surface 4a of the glass sheet 4 is cut off along the straight line in such a manner that the surface extending in the direction substantially perpendicular to the surface of the glass sheet 4 is left in the end surface 4a of the glass sheet 4, but the edge portion of the end surface 4a of the glass sheet 4 may be cut off along the straight line in such a manner that the surface extending in the substantially perpendicular direction is not left. In other words, the end surface 4a of the glass sheet 4 may be formed only of a tapered surface.

Ninth Embodiment

Figure 10:
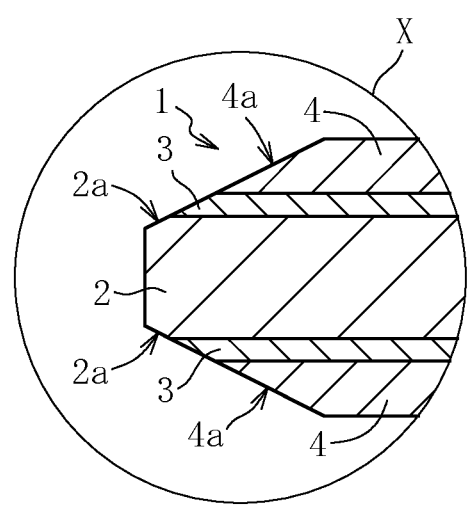
FIG. 10 is an enlarged sectional view illustrating a main part of a laminate according to a ninth embodiment of the present invention.

As illustrated in FIG. 10, a laminate 1 according to a ninth embodiment of the present invention is different from the laminates 1 according to the fifth to eighth embodiments in that the chamfering is carried out continuously over a range from the end surface 4a of the glass sheet 4 to the end surface 2a of the resin sheet 2.

Specifically, in this embodiment, the region ranging from the end surface 4a of the glass sheet 4 to the end surface 2a of the resin sheet 2 is chamfered into a single inclined surface.

Example 1

Description is given of an example of results of an evaluation test obtained in a case where the end surface of the glass sheet of the laminate was chamfered and in a case where the end surface of the glass sheet of the laminate was not chamfered.

In this evaluation test, another member was brought into contact with an end surface of each of laminates according to Examples 1 to 5 and a laminate according to Comparative Example 1 so as to inspect whether or not chipping or separation occurred in the glass sheet.

The basic structure of the laminates according to Examples 1 to 5 and the laminate according to Comparative Example 1 is as follows. That is, the laminates according to the examples and the laminate according to the comparative example are both formed by adhering glass sheets to both surfaces of a resin sheet. Each glass sheet is made of alkali-free glass (OA-10G manufactured by Nippon Electric Glass Co., Ltd.), and has a thickness of 0.1 mmt and plane dimensions of 100 mm×100 mm in Examples 1 and 3 and Comparative Example 1, 99.5×99.5 mm in Example 2, and 99 mm×99 mm in Examples 4 and 5. The resin sheet is made of polycarbonate, and has dimensions of 100 mm×100 mm1 mmt. Further, the glass sheets are integrally laminated on the resin sheet with adhesive layers. Each adhesive layer is made of an acrylic pressure sensitive adhesive, and has a thickness of 0.025 mmt.

As test conditions for the evaluation test, the end surface of the laminate is brought into contact with waterproof sand paper (#320) of a grinding machine (Knuth Rotor) at a contact angle of 60° with a load of 2 N for one second. This evaluation test is conducted on both surfaces of four edges of the laminate. That is, the evaluation test is conducted on a single laminate eight times in total. Under those conditions, chipping portions of 50 μm or more and separating portions that were generated in the end surface of the glass sheet of the laminate were counted. FIG. 11 shows results thereof.

Referring to FIG. 11, it can be found that Examples 1 to 5, in which the end surface of the glass sheet was chamfered, produced satisfactory results, specifically, the chipping and the separation were reduced more greatly than in Comparative Example 1, in which the end surface of the glass sheet was not chamfered. Further, it can be said that the structure in which the end surface of the resin sheet protrudes with respect to the end surface of the glass sheet as in Examples 4 and 5 is particularly preferred from the viewpoint of preventing the chipping and the separation.

Tenth Embodiment

A laminate according to a tenth embodiment of the present invention is in common with the laminates according to the above-mentioned first to ninth embodiments in that the glass sheet having a thickness of 300 μm or less is integrally laminated on at least one of both surfaces of the resin sheet, and the laminate according to the tenth embodiment is different from the laminates according to the first to ninth embodiments in the following matters.

That is, as illustrated in FIG. 12, corners of a laminate 1 according to the tenth embodiment are chamfered so that edge portions of corner portions 1a of the laminate 1 are formed into a substantially arc-like shape. With this structure, the corner portions 1a of the laminate 1 do not have an acute angle of 90° or less, with the result that the stress concentration that may occur in the corner portions 1a due to the difference in thermal expansion between the glass sheet 4 and the resin sheet 2 is relieved and the separation does not easily occur.

Note that, in the laminate 1 according to the tenth embodiment, at least the end surface 4a of the glass sheet 4 is chamfered. Specifically, the end surface of the laminate 1 has, for example, any one of the shapes as described above with reference to FIGS. 2 to 10.

The laminate 1 described above is, for example, manufactured in the following manner. That is, first, the glass sheets 4 are integrally laminated on both surfaces of the resin sheet 2 through an intermediation of the adhesive layers 3 made of an adhesive. Subsequently, the corner portions 1a of the laminate 1 obtained by integrally laminating the glass sheets 4 on the resin sheet 2 are chamfered. The corner chamfering is carried out by mechanically grinding the corner portions 1a of the laminate 1 with the grinding wheel. Note that, when grinding the corner portions 1a of the laminate 1, the corner portions of the glass sheet 4 and the corresponding corner portions of the resin sheet 2 are ground at the same time. As a matter of course, the corner portions of the glass sheet 4 and the corresponding corner portions of the resin sheet 2 may be ground independently.

Eleventh Embodiment

As illustrated in FIG. 13, a laminate 1 according to an eleventh embodiment of the present invention is different from the laminate 1 according to the tenth embodiment in that the corner portions 1a of the laminate 1 are chamfered into a polygonal shape obtained by combining obtuse angles (preferably 120° or more).

Example 2

Description is given of an example of results of an evaluation test obtained in a case where the corner portions of the laminate have a polygonal shape or a curved shape and in a case where the corner portions of the laminate form a substantially right angle.

In this evaluation test, laminates according to Examples 6 and 7 and a laminate according to Comparative Example 2 were cooled after heating so as to inspect whether or not separation occurred in each laminate.

The basic structure of the laminates according to Examples 6 and 7 and the laminate according to Comparative Example 2 is as follows. That is, the laminates according to the examples and the laminate according to the comparative example are both formed by adhering glass sheets to both surfaces of a resin sheet. Each glass sheet is made of alkali-free glass (OA-10G manufactured by Nippon Electric Glass Co., Ltd.), and has a thermal expansion coefficient of $38 \times 10^{-7}$/° C. and dimensions of 500 mm×500 mm×0.1 mmt. The resin sheet is made of polycarbonate, and has a thermal expansion coefficient of $70 \times 10^{-6}$/° C. and dimensions of 500 mm×500 mm×1 mmt. Further, the glass sheets are integrally laminated on the resin sheet with adhesive layers. Each adhesive layer is made of an ultraviolet curable acrylic adhesive, and has dimensions of 500 mm×500 mm×0.01 mmt. The corner portions of the laminate according to Example 6 are chamfered at a curvature radius of 10 mm. The corner portions of the laminate according to Example 7 are chamfered into a polygonal shape obtained by combining three obtuse angles (160°, 130°, and 160° in an order from one edge side of the laminate), and the chamfered corner portions have dimensions of 10 mm×10 mm. In contrast, the corner portions of the laminate according to Comparative Example 2 are not chamfered.

As test conditions for the evaluation test, the temperature of the laminate was raised from room temperature to 90° C. at a rate of 1° C./min, and was maintained at 90° C. for two hours. After that, the temperature of the laminate was dropped down to −40° C. at a rate of −1° C./min, and was maintained at −40° C. for two hours. Then, the temperature of the laminate was raised again up to 90° C. at a rate of 1° C./min, and was maintained at 90° C. for two hours. This temperature cycle was carried out 20 times, and the temperature of the laminate was finally dropped from 90° C. to room temperature at a rate of −1° C./min. Through the heating and cooling of the laminate under those temperature conditions, the presence and absence of the separation was inspected. FIG. 14 shows results thereof.

Referring to FIG. 14, it can be found that Examples 6 and 7, in which the corner portions of the laminate were chamfered, produced satisfactory results, specifically, the separation was reduced more greatly than in Comparative Example 2, in which the corner portions were not chamfered. Further, the structure in which the corner portions of the laminate have a substantially arc-like shape as in Example 6 is particularly preferred because the effect of relieving the stress concentration becomes greater.

Twelfth Embodiment

A laminate according to a twelfth embodiment of the present invention is in common with the laminates according to the above-mentioned embodiments in that the glass sheet is integrally laminated on at least one of both surfaces of the resin sheet, and the laminate according to the twelfth embodiment is different from the laminates according to the above-mentioned embodiments in following matters.

That is, as illustrated in FIG. 15, the laminate 1 may comprise a depressed portion 5 and a projecting portion 6 formed at an outer peripheral part thereof. Further, when bending portions 5*a* and 6*a* formed by crossing straight lines (for example, two straight lines orthogonal to each other) are located in a region in which the depressed portion 5 and the projecting portion 6 are formed, in a case where a significant temperature change occurs in a surrounding environment of the laminate 1 (for example, in a case where the temperature of the surrounding environment of the laminate 1 is raised from 20° C. to 80° C.), the tensile stress acting on the glass sheet 4 due to the difference in thermal expansion between the glass sheet 4 and the resin sheet 2 concentrates on the bending portions 5*a* and 6*a*, thus leading to a problem in that the glass sheet 4 is liable to be damaged.

Therefore, as illustrated in FIG. 16, a laminate 1 according to the twelfth embodiment comprises a depressed portion 5 formed at one of two opposing edges of the laminate 1 on an outer periphery thereof, and a projecting portion 6 formed at another of the two opposing edges. Corners corresponding to bending portions 5*a* of the depressed portion 5 and corners corresponding to bending portions 6*a* of the projecting portion 6 are chamfered into a continuous arc-like shape (curved shape). With this structure, the bending portions 5*a* formed in the depressed portion 5 of the laminate 1 and the bending portions 6*a* formed in the projecting portion 6 of the laminate 1 do not have an acute angle. Therefore, the concentration of the tensile stress acting on the bending portions of the glass sheet 4 due to the difference in thermal expansion between the glass sheet 4 and the resin sheet 2 is relieved, and the glass sheet 4 is not easily damaged. In this case, the curvature radius of the bending portions 5*a* and 6*a* is preferably 0.5 mm or more, further preferably 1 mm or more.

Example 3

Description is given of an example of results of an evaluation test obtained in a case where the bending portions of the deformed portion formed of the depressed portion (or the projecting portion) formed on the outer periphery of the laminate have a curved shape and in a case where the bending portions of the deformed portion do not have a curved shape.

In this evaluation test, a laminate according to Example 8 and laminates according to Comparative Examples 3 and 4 were cooled after heating so as to inspect whether or not breaking occurred in each glass sheet.

The basic structure of the laminate according to Example 8 and the laminates according to Comparative Examples 3 and 4 is as follows. That is, the laminate according to the example and the laminates according to the comparative examples are both formed by adhering glass sheets to both surfaces of a resin sheet. Each laminate comprises a depressed portion of 30 mm (short side direction)×10 mm (long side direction) at a center portion of the short side. Each glass sheet is made of alkali-free glass (OA-10G manufactured by Nippon Electric Glass Co., Ltd.), and has a thermal expansion coefficient of $38 \times 10^{-7}$/° C. and dimensions of 50 mm×100 mm×0.1 mmt. The resin sheet is made of polycarbonate, and has a thermal expansion coefficient of $70 \times 10^{-6}$/° C. and dimensions of 50 mm×100 mm×1 mmt. Further, the glass sheets are integrally laminated on the resin sheet with adhesive layers. Each adhesive layer is made of an ultraviolet curable acrylic adhesive, and has dimensions of 50 mm×100 mm×0.01 mmt. The corners corresponding to bending portions formed in the depressed portion of the laminate according to Example 8 are chamfered into an arc-like shape at a curvature radius of 2 mm. The corners corresponding to bending portions formed in the depressed portion of the laminate according to Comparative Example 3 are not chamfered. The corners corresponding to bending portions formed in the depressed portion of the laminate according to Comparative Example 4 are chamfered into a polygonal shape obtained by combining two obtuse angles (each 225°), and the chamfered corner portions have dimensions of 2 mm×2 mm.

As test conditions for the evaluation test, the temperature of the laminate was raised from room temperature to 90° C. at a rate of 1° C./min, and was maintained at 90° C. for two hours. After that, the temperature of the laminate was dropped down to −40° C. at a rate of −1° C./min, and was maintained at −40° C. for two hours. Then, the temperature of the laminate was raised again up to 90° C. at a rate of 1° C./min, and was maintained at 90° C. for two hours. This temperature cycle was carried out 20 times, and the temperature of the laminate was finally dropped from 90° C. to room temperature at a rate of −1° C./min. Through the heating and cooling of the laminate under those temperature conditions, the presence and absence of the breaking in each glass sheet was inspected. FIG. 17 shows results thereof.

As shown in FIG. 17, Example 8, in which the corners corresponding to the bending portions formed in the depressed portion of the laminate were chamfered into a substantially arc-like shape, produced satisfactory results, specifically, the breaking of the glass sheet was reduced more reliably than in Comparative Examples 3 and 4, in which the bending portions formed by crossing straight lines were left in the depressed portion. Note that, the same results are obtained for the bending portions of the projecting portion.

Thirteenth Embodiment

A laminate according to a thirteenth embodiment of the present invention is in common with the laminates according to the above-mentioned embodiments in that the glass sheet is integrally laminated on at least one of both surfaces of the resin sheet, and the laminate according to the thirteenth embodiment is different from the laminates according to the above-mentioned embodiments in following matters.

That is, as illustrated in FIG. 18, the laminate 1 may comprise an opening portion 7 having a substantially rectangular shape portion formed in a flat surface thereof. Further, when bending portions 7*a* formed by crossing straight lines (for example, two straight lines orthogonal to each other) are located in a region in which the opening portion 7 is formed, in a case where a significant temperature change occurs in a surrounding environment of the laminate 1 (for example, in a case where the temperature of the surrounding environment of the laminate is raised from 20° C. to 80° C.), the tensile stress acting on the glass sheet 4 due to the difference in thermal expansion between the glass sheet 4 and the resin sheet 2 concentrates on the bending portions 7a so that the glass sheet 4 is liable to be damaged.

Therefore, as illustrated in FIG. 19, corners of a laminate 1 according to the thirteenth embodiment are chamfered so that the bending portions 7a of the opening portion 7 formed in a flat surface of the laminate 1 are formed into a continuous arc-like shape (curved shape). With this structure, the bending portions 7a formed in the opening portion 7 of the laminate 1 do not have an acute angle. Therefore, the concentration of the tensile stress acting on the bending portions of the glass sheet 4 due to the difference in thermal expansion between the glass sheet 4 and the resin sheet 2 is relieved, and the glass sheet 4 is not easily damaged. In this case, the curvature radius of the bending portions 7a is preferably 0.5 mm or more, further preferably 1 mm or more.

Example 4

Description is given of an example of results of an evaluation test obtained in a case where the bending portions formed in the opening portion of the laminate have a curved shape and in a case where the bending portions formed in the opening portion do not have a curved shape.

In this evaluation test, laminates according to Examples 9 and 10 and laminates according to Comparative Examples 5 and 6 were cooled after heating so as to inspect whether or not breaking occurred in each glass sheet.

The basic structure of the laminates according to Examples 9 and 10 and the laminate according to Comparative Examples 5 and 6 is as follows. That is, the laminates according to the examples and the laminate according to the comparative examples are both formed by adhering glass sheets to both surfaces of a resin sheet. Each laminate comprises an opening portion of 30 mm (short side direction)×10 mm (long side direction) at a center portion thereof. (The center point of the contour of the outer periphery of the laminate matches with the center point of the contour of the opening portion.) Each glass sheet is made of alkali-free glass (OA-10G manufactured by Nippon Electric Glass Co., Ltd.), and has a thermal expansion coefficient of $38 \times 10^{-7}/°$ C. and dimensions of 50 mm×100 mm×0.1 mmt. The resin sheet is made of polycarbonate, and has a thermal expansion coefficient of $70 \times 10^{-6}/°$ C. and dimensions of 50 mm×100 mm×1 mmt. Further, the glass sheets are integrally laminated on the resin sheet with adhesive layers. Each adhesive layer is made of an ultraviolet curable acrylic adhesive, and has dimensions of 50 mm×100 mm×0.01 mmt. The corners corresponding to bending portions formed in the opening portion of the laminate according Example 9 are chamfered into an arc-like shape at a curvature radius of 2 mm. The corners corresponding to bending portions formed in the opening portion of the laminate according Example 10 are chamfered into an arc-like shape at a curvature radius of 5 mm. The corners corresponding to bending portions formed in the opening portion of the laminate according to Comparative Example 5 are not chamfered. The corners corresponding to bending portions formed in the opening portion of the laminate according to Comparative Example 6 are chamfered into a polygonal shape obtained by combining two obtuse angles (each 225°), and the chamfered corner portions have dimensions of 2 mm×2 mm.

As test conditions for the evaluation test, the temperature of the laminate was raised from room temperature to 90° C. at a rate of 1° C./min, and was maintained at 90° C. for two hours. After that, the temperature of the laminate was dropped down to −40° C. at a rate of −1° C./min, and was maintained at −40° C. for two hours. Then, the temperature of the laminate was raised again up to 90° C. at a rate of 1° C./min, and was maintained at 90° C. for two hours. This temperature cycle was carried out 20 times, and the temperature of the laminate was finally dropped from 90° C. to room temperature at a rate of −1° C./min. Through the heating and cooling of the laminate under those temperature conditions, the presence and absence of the breaking in each glass sheet was inspected. FIG. 20 shows results thereof.

As shown in FIG. 20, Examples 9 and 10, in which the corners corresponding to the bending portions formed in the opening portion of the laminate were chamfered into a substantially arc-like shape, produced satisfactory results, specifically, the breaking of the glass sheet was reduced more reliably than in Comparative Examples 5 and 6, in which the bending portions formed by crossing straight lines were left in the opening portion.

Fourteenth Embodiment

A fourteenth embodiment of the present invention relates to a cutting method for a laminate obtained by integrally laminating glass sheets on both surfaces of a resin sheet. This cutting method is used for cutting the above-mentioned laminate 1 into a predetermined shape and dimensions.

Figure 21:
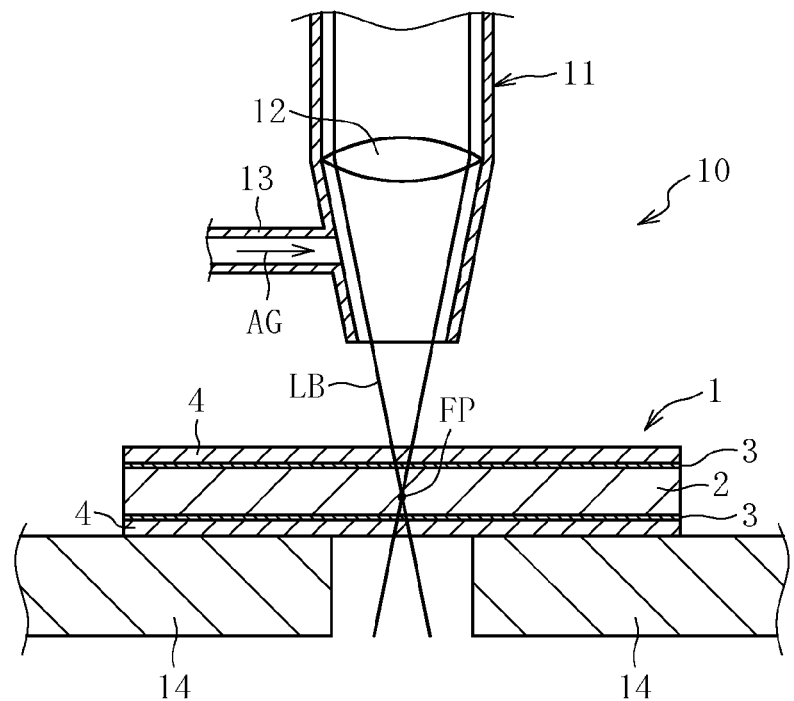
FIG. 21 is an explanatory view illustrating a cutting method for a laminate according to a fourteenth embodiment of the present invention.

FIG. 21 is a view illustrating a cutting apparatus for implementing the cutting method for a laminate according to the fourteenth embodiment. A cutting apparatus 10 of this embodiment is configured to carry out laser fusing on the laminate 1, and comprises a laser irradiation apparatus 11 for radiating a laser beam LB, and support stages 14 for supporting the laminate 1. Note that, in this embodiment, the laminate 1 is irradiated with the laser beam LB from the top of the laminate 1. That is, an upper surface of the laminate 1 corresponds to an incident side of the laser beam LB, and a lower surface of the laminate 1 corresponds to a non-incident side of the laser beam LB.

The laser irradiation apparatus 11 has an internal space for propagating the laser beam LB, and comprises a lens 12 for condensing the laser beam LB, and a gas jet nozzle 13 for jetting an assist gas AG.

As the laser beam LB, for example, a carbon dioxide laser and a YAG laser may be used, and the laser beam LB may be continuous light and pulsed light.

The lens 12 is arranged in the internal space of the laser irradiation apparatus 11, and is configured to condense the laser beam LB so as to form a focal point FP inside the laminate 1. To give an additional remark, the laser irradiation apparatus 11 is raised and lowered with respect to the laminate 1, to thereby adjust the position of the focal point FP. Note that, the lens 12 may be arranged outside the laser irradiation apparatus 5.

The gas jet nozzle 13 is connected to a distal end portion of the laser irradiation apparatus 11, and is configured to supply the assist gas AG to the internal space of the laser irradiation apparatus 11 (space below the lens 12). The assist gas AG supplied to the internal space of the laser irradiation apparatus 11 is jetted directly downward (in a substantially perpendicular direction) from the distal end of the laser irradiation apparatus 11 toward the laminate 1. That is, the laser beam LB is emitted and the assist gas AG is jetted from the distal end of the laser irradiation apparatus 11. The assist gas AG serves to remove molten foreign matter, which is generated when the laminate 1 is fused, from the cut portion of the laminate 1, to protect the optical components such as the lens 12 of the laser irradiation apparatus 11 from the molten foreign matter, and further to cool the lens 12 so as to remove heat therefrom.

Note that, the kind of the assist gas AG is not particularly limited, and for example, a publicly known gas such as an oxygen gas, a water vapor, a carbon dioxide gas, a nitrogen gas, and an argon gas is used alone or a plurality of kinds of those gases are used in combination. The assist gas AG may be jetted as a hot gas. The assist gas AG (gas jet nozzle 13) may be omitted as appropriate.

The laminate 1 to be cut is obtained by integrally laminating the glass sheets 4 on both surfaces of the resin sheet 2 with the adhesive layers 3, respectively. Note that, the adhesive layers 3 may be omitted as appropriate.

Next, description is given of the cutting method for the laminate 1 through use of the cutting apparatus structured as described above.

Figure 22:
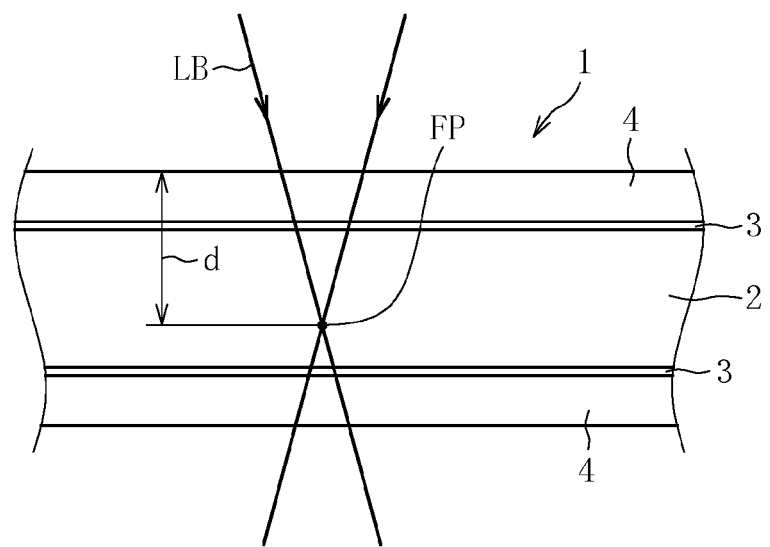
FIG. 22 is an enlarged sectional view illustrating a state in the vicinity of a laminate in FIG. 21.

First, as illustrated in FIG. 22, the focal point FP of the laser beam LB radiated from the laser irradiation apparatus 11 is adjusted inside the laminate 1. A distance "d" of the focal point FP from the incident side (upper surface side) of the laser beam LB is set within a range of more than 50% and 90% or less of an overall thickness of the laminate 1 (preferably 60% or more and 80% or less). Note that, in this embodiment, the position of the focal point FP is located inside the resin sheet 2 of the laminate 1.

Figure 23:
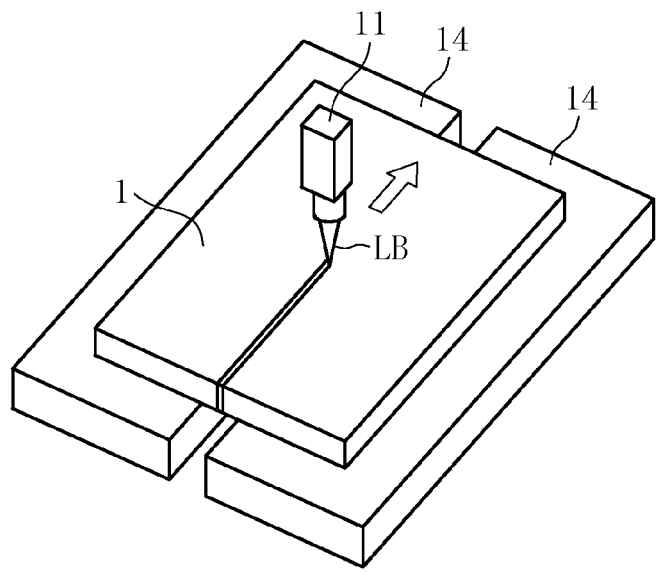
FIG. 23 is a perspective view illustrating a situation in which the laminate is cut by a cutting apparatus in FIG. 21.

Subsequently, under a state in which this positional relationship is maintained, as illustrated in FIG. 23, the laser irradiation apparatus 11 is moved in a scanning manner with respect to the laminate 1 to fuse and cut the laminate 1 into a desired shape and dimensions. Note that, when the laser irradiation apparatus 11 and the laminate 1 move relative to each other, any of the laser irradiation apparatus 11 and the laminate 1 may be moved.

At this time, laser power and laser scanning speed are adjusted so that a value of (laser power)/(laser scanning speed) becomes 0.001 to 1 (preferably 0.01 to 0.1) W·min/mm. Note that, the laser power is, for example, 1 to 100 W, and the laser scanning speed is, for example, 100 to 10,000 mm/min.

With this method, the position of the focal point FP of the laser beam LB is located closer to a lower side with respect to a center position of the laminate 1 in the thickness direction, and hence a sufficient amount of heat is also transferred to the lower glass sheet 4 side. Thus, the lower glass sheet 4 can also be cut accurately without hindering the propagation of the laser beam LB inappropriately due to the molten foreign matter generated at the time of fusing.

Example 5

Next, description is given of an example of results of an evaluation test for laminates according to examples of the present invention.

In this evaluation test, laminates according to Examples 11 to 13 and laminates according to Comparative Examples 7 to 9 were subjected to laser fusing under predetermined conditions, and the maximum size of cracks generated in the end surface of the glass sheet at this time was inspected. Note that, the laser fusing was carried out through use of a carbon dioxide laser.

The basic structure of the laminates according to Examples 11 to 13 and the laminates according to Comparative Examples 7 to 9 is as follows. That is, the laminates according to the examples and the laminates according to the comparative examples are both formed by adhering glass sheets to both surfaces of a resin sheet. Each glass sheet is made of alkali-free glass (OA-10G manufactured by Nippon Electric Glass Co., Ltd.), and has a thermal expansion coefficient of $38 \times 10^{-7}/°$ C. and dimensions of 200 mm×200 mm. The resin sheet is made of polycarbonate, and has dimensions of 200 mm×200 mm. Further, the glass sheets are integrally laminated on the resin sheet with adhesive layers. Each adhesive layer is made of an acrylic pressure sensitive adhesive, and has dimensions of 200 mm×200 mm×0.025 mmt.

As test conditions for the evaluation test, each laminate was irradiated with a laser beam from the top of the laminate to carry out the laser fusing, and thus the laminate was trimmed so that the size became 150 mm×150 mm and the curvature radius of each corner portion formed by crossing two orthogonal edges became 10 mm. Then, the maximum size of the depth of cracks generated in the end surface of the glass sheet was measured. Table 1 shows results thereof. Note that, the maximum size of the crack depth that exceeds 0.2 mm causes damage to the glass sheet.

TABLE 1

|  | Example 11 | Example 12 | Example 13 | Comparative Example 7 | Comparative Example 8 | Comparative Example 9 |
| --- | --- | --- | --- | --- | --- | --- |
| Thickness of glass sheet (mm) | 0.1 | 0.1 | 0.1 | 0.1 | 0.1 | 0.1 |
| Thickness of resin sheet (mm) | 0.8 | 0.8 | 0.8 | 0.8 | 0.8 | 0.8 |
| Thickness of adhesive layer (mm) | 0.025 | 0.025 | 0.025 | 0.025 | 0.025 | 0.025 |
| Laser power (W) | 15 | 15 | 15 | 15 | 15 | 15 |
| Moving speed (mm/min) | 400 | 400 | 400 | 400 | 400 | 400 |
| Laser power/moving speed (W · min/mm) | 0.0375 | 0.0375 | 0.0375 | 0.0375 | 0.0375 | 0.0375 |
| Position of focal point (mm) * | 0.6 | 0.7 | 0.8 | 0.05 | 0.5 | 9.95 |

TABLE 1-continued

|  |  | Example 11 | Example 12 | Example 13 | Comparative Example 7 | Comparative Example 8 | Comparative Example 9 |
|---|---|---|---|---|---|---|---|
| Fusing |  | Possible | Possible | Possible | Possible | Possible | Possible |
| Upper surface glass sheet | Crack depth (mm) | 0.1 | 0.1 | 0.13 | 0.04 | 0.1 | 0.24 |
| Lower surface glass sheet | Crack depth (mm) | 0.16 | 0.12 | 0.11 | 0.22 | 0.2 | 0.08 |

* Depth from glass surface on upper surface side of laminate

It can be found also from Table 1 that the crack depth of the glass sheet of the fused laminate is smaller in Examples 11 to 13 than in Comparative Examples 7 to 9.

That is, in a case where the position of the focal point of the laser beam is not more than 50% and 90% or less of the overall thickness of the laminate as in Comparative Examples 7 to 9, the crack depth of the glass sheet is larger than 0.2 mm, which causes damage to the glass sheet. In contrast, in Examples 11 to 13, the position of the focal point of the laser beam was restricted to fall within the above-mentioned numerical range, with the result that the crack depth of the glass sheet became smaller and the crack depth exceeding 0.2 mm that might cause damage to the glass sheet was not generated.

Note that, in the above-mentioned examples, it is preferred that the edge portion of the fused surface of the glass sheet of the laminate be chamfered after the laser fusing.

Fifteenth Embodiment

In the case where the laminate 1 is subjected to the laser fusing, it is preferred to adjust the position of the focal point FP of the laser beam LB as in the fourteenth embodiment, but the laminate 1 may be cut in the following manner.

Figure 24:
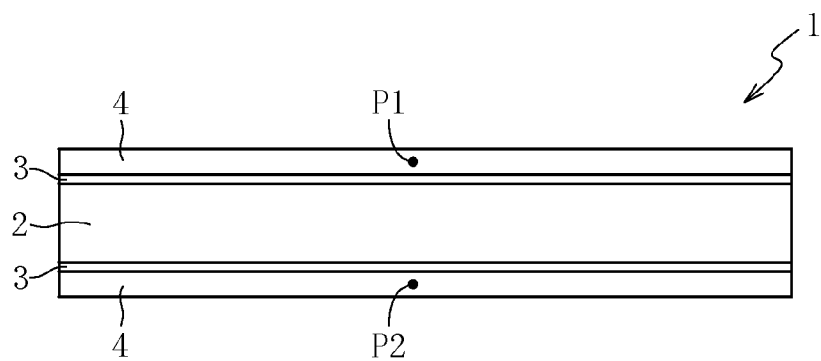
FIG. 24 is an explanatory view illustrating a cutting method for a laminate according to a fifteenth embodiment of the present invention.

That is, as illustrated in FIG. 24, a laser beam L1 may be radiated twice at the same position. In addition, a position P1 of the focal point at the time of the first irradiation with the laser beam L1 may be set at a middle position in the thickness direction of the glass sheet 4 that is located on the laser irradiation side, and a position P2 of the focal point at the time of the second irradiation with the laser beam L1 may be set at a middle position in the thickness direction of the glass sheet 4 that is located on the other side.

Sixteenth Embodiment

Figure 25:
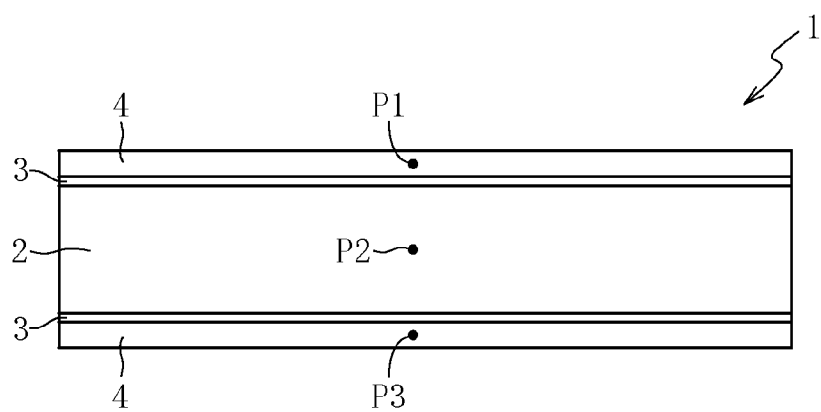
FIG. 25 is an explanatory view illustrating a cutting method for a laminate according to a sixteenth embodiment of the present invention.

Further, for example, in a case where the resin sheet 2 is relatively thicker, as illustrated in FIG. 25, the laser beam L1 may be radiated three times at the same position. In addition, the position P1 of the focal point at the time of the first irradiation with the laser beam L1 may be set at the middle position in the thickness direction of the glass sheet 4 that is located on the laser irradiation side, the position P2 of the focal point at the time of the second irradiation with the laser beam L1 may be set at a middle position in the thickness direction of the resin sheet 2, and a position P3 of the focal point at the time of the third irradiation with the laser beam L1 may be set at the middle position in the thickness direction of the glass sheet 4 that is located on the other side.

Seventeenth Embodiment

Figure 26:
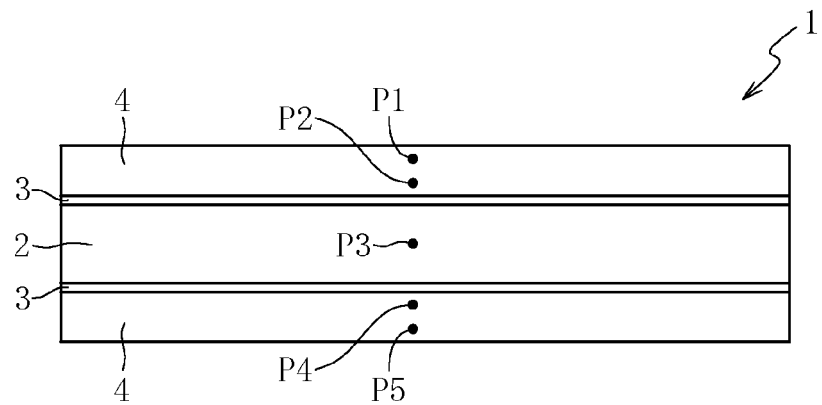
FIG. 26 is an explanatory view illustrating a cutting method for a laminate according to a seventeenth embodiment of the present invention.

Further, for example, in a case where the glass sheets 4 and the resin sheet 2 are relatively thicker, as illustrated in FIG. 26, the laser beam L1 may be radiated five times at the same position. In addition, positions P1 to P5 of the focal point of the laser beam may be defined by shifting the focal point between the laser irradiation side and the opposite side so that the positions P1 and P2 of the focal point at the time of the first and second irradiation with the laser beam L1 are set at the middle positions in the thickness direction of the glass sheet 4 that is located on the laser irradiation side, that the position P3 of the focal point at the time of the third irradiation with the laser beam L1 is set the middle position in the thickness direction of the resin sheet 2, and that the positions P4 and P5 of the focal point at the time of the fourth and fifth irradiation with the laser beam L1 are set at the middle positions in the thickness direction of the glass sheet 4 that is located on the other side.

Eighteenth Embodiment

Figure 27:
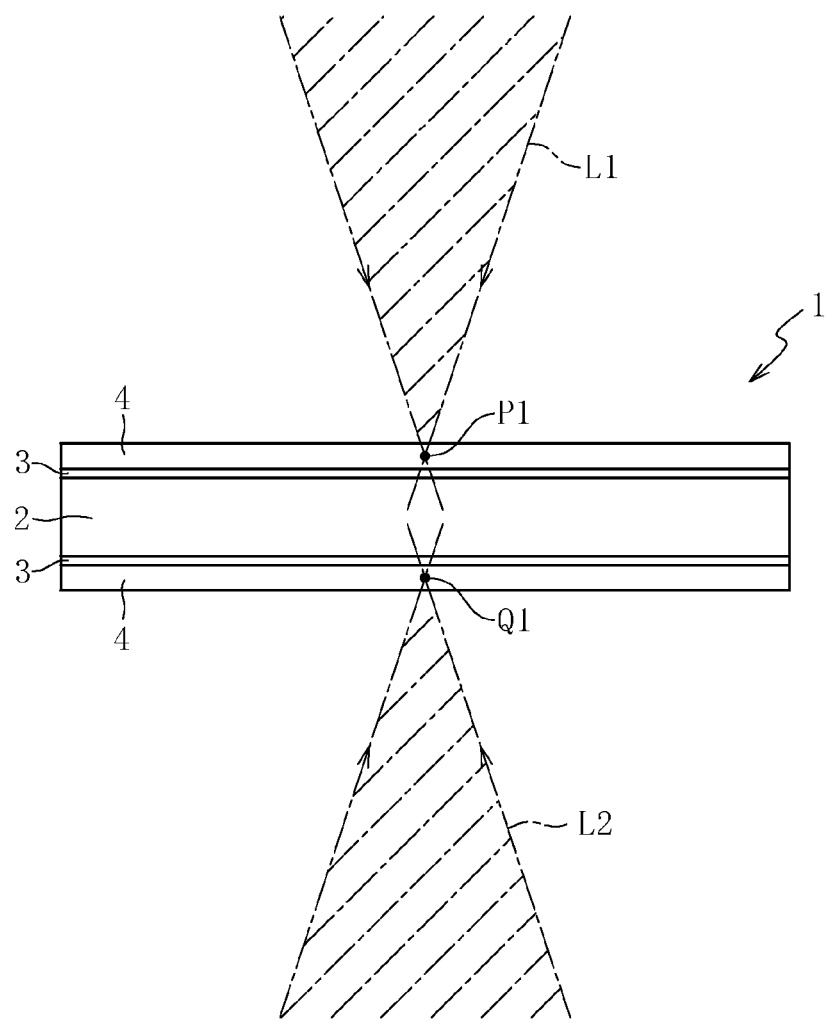
FIG. 27 is an explanatory view illustrating a cutting method for a laminate according to an eighteenth embodiment of the present invention.

Further, as illustrated in FIG. 27, laser beams L1 and L2 may be radiated on both front and back sides of the laminate 1, and the position P1 of the focal point of the laser beam L1 and a position Q1 of the focal point of the laser beam L2 may be set at the middle positions in the thickness direction of the respective glass sheets 4 that are located on the incident side of the laser beams L1 and L2 (in the example of FIG. 27, the upper glass sheet 4 in the case of the upper laser beam L1, and the lower glass sheet 4 in the case of the lower laser beam L2).

Nineteenth Embodiment

A nineteenth embodiment of the present invention relates to a cutting method for a laminate obtained by integrally laminating glass sheets on both surfaces of a resin sheet. This cutting method comprises a protection step of covering the surfaces of the laminate with protective tapes, a cutting step of carrying out laser fusing on the laminate covered with the protective tapes, and a separation step of separating the protective tapes from the surfaces of the laminate subjected to the laser fusing.

Figure 28:
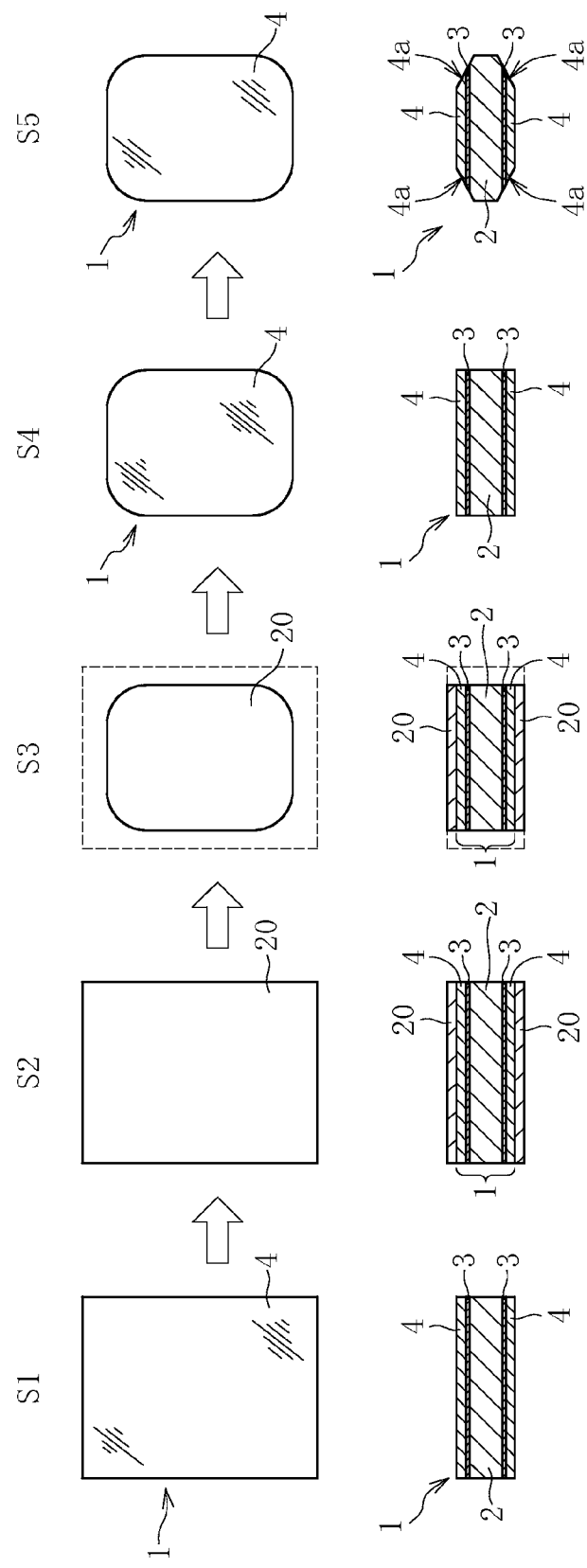
FIG. 28 is an explanatory view illustrating a manufacturing method for a laminate according to a nineteenth embodiment of the present invention.

Specifically, as illustrated in FIG. 28, the cutting method for a laminate according to the nineteenth embodiment is incorporated into a serial manufacturing process for a laminate. That is, the manufacturing process for a laminate comprises a step S1 of preparing the laminate 1 obtained by integrally laminating the glass sheets 4 on both surfaces of the resin sheet 2 through an intermediation of the adhesive layers 3, respectively, a step S2 of attaching separable protective tapes 20 to both surfaces of the laminate 1, a step S3 of carrying out laser fusing on the laminate 1 having the protective tapes 20 attached thereto so as to obtain a predetermined shape, a step S4 of separating the protective tapes 20 from the laminate 1 subjected to the laser fusing, and a step S5 of chamfering the end surface of the laminate 1 from which the protective tapes 20 are separated.

With this method, the laser fusing is carried out under a state in which the exposed surface of each glass sheet 4 is protected by the protective tape 20, and hence, even when molten foreign matter is generated from the glass and the resin at the time of fusing, the molten foreign matter does not directly adhere to the surface of the glass sheet 4. Thus, when the protective tape 20 is separated from the surface of the glass sheet 4 of the laminate 1 after the fusing, the cleanliness of the surface of the glass sheet 4 can be maintained easily and reliably.

In this case, the protective tape 20 is not particularly limited as long as the protective tape 20 is separable from the surface of the glass sheet 4. In a case of using an ultraviolet separating tape and a heat separating tape, an ultraviolet irradiation step and a heating step are required to decrease the pressure sensitive adhesive strength, but there is a risk in that those steps cause damage to the glass sheet 4 at a point starting from a microcrack generated in the end surface of the glass sheet 4 subjected to the laser fusing. Therefore, as the protective tape 20, it is preferred to use a low-pressure sensitive adhesive tape that does not require any treatment such as heating at the time of separation.

Twentieth Embodiment

A twentieth embodiment of the present invention relates to a processing method that comprises cutting of a laminate obtained by integrally laminating a glass sheet on at least one surface of a resin sheet. This processing method is, for example, applied to processing of the laminate 1 illustrated in FIG. 10.

Figure 29A:
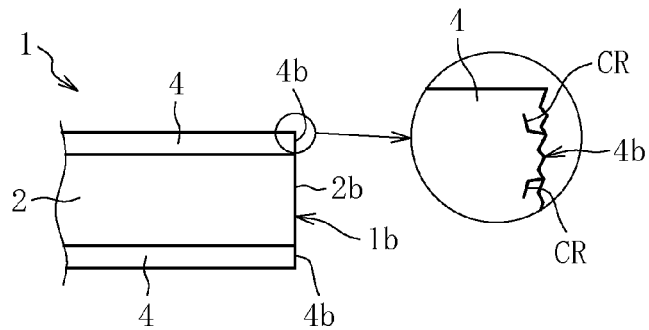
FIG. 29a is a schematic side view illustrating a laminate to which a processing method according to a twentieth embodiment of the present invention is applied.

First, referring to FIG. 29a, description is given of the structure of the laminate 1 to which the processing method according to the twentieth embodiment is applied. The laminate 1 illustrated in FIG. 29a is obtained by integrally laminating the glass sheets 4 on both surfaces of the resin sheet 2. One or both of the glass sheets 4 may be integrally laminated on the resin sheet 2 through an intermediation of an adhesive layer, but in a case where the adhesive layer is omitted as in the example of FIG. 29a, the glass sheet 4 is integrally laminated on the resin sheet 2 by, for example, welding.

The laminate 1 having the above-mentioned structure is cut out into a predetermined shape and dimensions through a cutting step of executing a cutting process such as laser fusing and water jet cutting, and has a cut surface 1b formed through the cutting step. As illustrated in an enlarged view of FIG. 29a, a cut surface 4b of the upper glass sheet 4 that forms the cut surface 1b of the laminate 1 is a rough surface having small projections and depressions in a continuous manner, and has innumerable cracks CR. Note that, although detailed illustration is omitted, a cut surface 4b of the lower glass sheet 4 has similar surface property to that of the cut surface 4b of the upper glass sheet 4. Further, although illustration is similarly omitted, a cut surface 2b of the resin sheet 2 is a rough surface having small projections and depressions in a continuous manner.

The processing method according to the twentieth embodiment has a feature in the structure of a finishing step of finishing the cut surface 1b of the laminate 1 that is formed into the rough surface as described above through the cutting step (with a predetermined accuracy). To give a brief description, the processing method has a feature in that the finishing step comprises a first phase of finishing the cut surfaces 4b of the glass sheets 4, and a second phase of finishing the cut surface 2b of the resin sheet 2. Now, referring to FIGS. 29b and 29c, the first phase of finishing the cut surfaces 4b of the glass sheets 4 is described in detail, and subsequently, referring to FIGS. 30a and 30b, the second phase of finishing the cut surface 2b of the resin sheet 2 is described in detail.

Figure 29B:
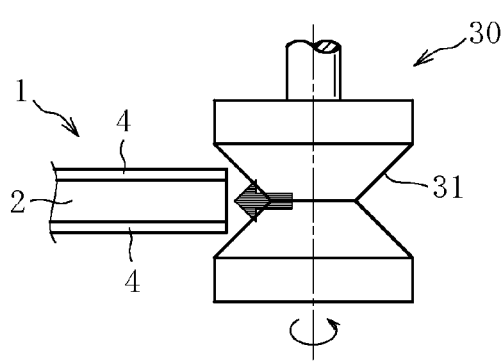
FIG. 29b is a conceptual view illustrating a first phase of a finishing step of the processing method according to the twentieth embodiment.
Figure 29C:
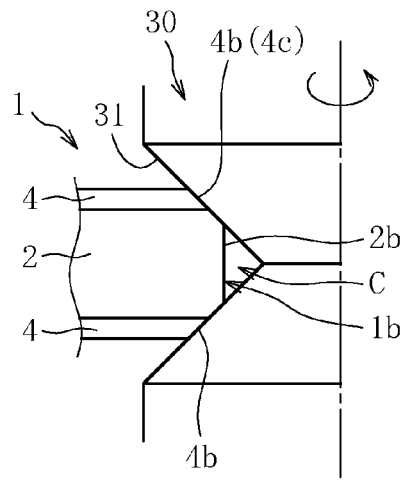
FIG. 29c is a conceptual view illustrating the first phase of the finishing step of the processing method according to the twentieth embodiment.

FIGS. 29b and 29c conceptually illustrate the first phase of the finishing step of finishing the cut surface 1b of the laminate 1. In the first phase, the cut surfaces 4b of the glass sheets 4 are processed (finished) by grinding, and at least a part of the cut surface 2b of the resin sheet 2 is left in an unprocessed state. Specifically, a grinding tool 30 having a grinding surface 31 with a V-shape in cross section, which is capable of simultaneously grinding both end portions of the cut surface 1b of the laminate 1 in the thickness direction, that is, the cut surfaces 4b of the glass sheets 4, is caused to rotate and approach the laminate 1 that is held in a predetermined posture, and the grinding surface 31 of the grinding tool 30 is pressed against the cut surfaces 4b of the glass sheets 4 to grind the cut surfaces 4b (end portions of the glass sheets 4 including the cut surfaces 4b). The grinding is continued until the end portions of the glass sheets 4 are cut off to the extent that the small projections and depressions, the cracks CR, and the like contained in the cut surfaces 4b are removed substantially completely. The dimension of cutting off the end portion of each glass sheet 4 differs depending on the cutting method employed for cutting the laminate 1, the thickness of the glass sheet 4, and the like, and is set to, for example, about 100 to 300 µm with respect to the cut surface 4b. In the twentieth embodiment, a part of the cut surface 2b of the resin sheet 2 (both end portions of the cut surface 2b in the thickness direction) is also processed by the grinding [see FIG. 29c]. Thus, when the grinding is completed, the cut surfaces 4b of the glass sheets 4 are processed into smooth surfaces 4c having a tapered shape as illustrated in FIG. 29c, and a center region of the cut surface 2b of the resin sheet 2 in the thickness direction is left in the unprocessed state.

It is preferred that the grinding in the above-mentioned first phase be executed as so-called constant-pressure grinding, which is gradually progressed under a state in which the grinding tool 30 is brought into contact with the surfaces to be processed (cut surfaces 4b of the glass sheets 4 and both end portions of the cut surface 2b of the resin sheet 2 in the thickness direction) at a constant contact force. This is for the purpose of preventing, to the extent possible, trouble such as breaking that may occur in the glass sheets 4 due to application of an excessive pressure to the glass sheets 4 during the grinding. Conversely, when the breaking or the like of the glass sheets 4 along with the grinding can be prevented to the extent possible by employing the constant-pressure grinding, the feed speed of the grinding tool 30 can be increased so as to enhance the finishing efficiency of the cut surfaces 4b of the glass sheets 4.

Further, as illustrated in FIG. 29c, the grinding is progressed under a state in which a clearance C is provided between the cut surface 2b of the resin sheet 2 and a bottom portion of the grinding surface 31 of the grinding tool 30. This is for the purpose of enabling smooth discharging of chips, which are generated along with the grinding, to the outside of the processing point, to thereby prevent decrease in grinding accuracy and the breaking of the glass sheets 4 to the extent possible.

Figure 30A:
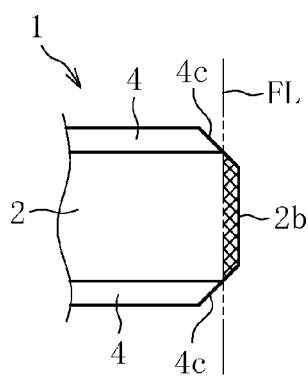
FIG. 30a is a conceptual view illustrating a second phase of the finishing step of the processing method according to the twentieth embodiment.
Figure 30B:
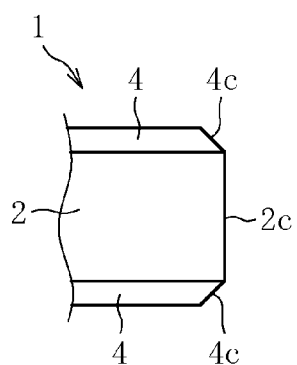
FIG. 30b is a partial side view illustrating the laminate after completion of the finishing step of the processing method according to the twentieth embodiment.

When the cut surface 1b of the laminate 1 is finished in the above-mentioned manner by the above-mentioned grinding, the laminate 1 is transported to the second phase of the finishing step. In the second phase, only the cut surface 2b that is left in the unprocessed state is processed by cutting work. More specifically, as illustrated in FIGS. 30a and 30b, the end portion of the resin sheet 2 including the cut surface 2b that is left in the unprocessed state is cut off along a preset finishing line FL (a region indicated by cross hatching in FIG. 30a is cut off), and thus the cut surface 2b of the resin sheet 2 is finished into a smooth surface 2c extending in the thickness direction. The cutting work is executed through use of a cutting tool such as an end mill, and as the cutting tool, a non-coated cutting tool having no protective coating formed on a surface thereof is suitably used. This is because the non-coated cutting tool has blade portions (cutting edges) exposed in a sharp state without being covered with the protective coating, and hence the sharpness for cutting a resin is more satisfactory as compared to a coated cutting tool having a protective coating formed on a surface thereof, with the result that the non-coated cutting tool may process the cut surface 2b of the resin sheet 2 particularly efficiently. Note that, the preset finishing line FL in the state illustrated in FIG. 30a may be shifted toward the cut surface 2b of the resin sheet 2 so that the smooth surface 2c of the resin sheet 2 protrudes with respect to the smooth surfaces 4c of the glass sheets 4 after the cutting (see FIG. 10).

When the cut surface 2b of the resin sheet 2 is finished into the smooth surface 2c in the manner described above, the finishing step of finishing the cut surface 1b of the laminate 1 is completed.

As described above, in the twentieth embodiment, when finishing the cut surface 1b of the laminate 1, the first phase is first executed to process the cut surfaces 4b of the glass sheets 4 by grinding, and to leave a part of the cut surface 2b of the resin sheet 2 in the unprocessed state. With this method, when grinding the cut surfaces 4b of the glass sheets 4 (end portions including the cut surfaces 4b), large resin chips are not easily generated, and in addition, the resin sheet 2 functions as a backup member for the glass sheets 4 so that the glass sheets 4 are not easily distorted when the grinding tool 30 is pressed against the cut surfaces 4b of the glass sheets 4. In particular, this effect is remarkably produced in the case where the resin sheet 2 is relatively thicker than each glass sheet 4 as in this embodiment. Thus, when grinding the cut surfaces 4b of the glass sheets 4, trouble such as breaking and chipping of the glass sheets 4 can be prevented to the extent possible while increasing the feed speed of the grinding tool 30 so as to enhance the finishing efficiency of the glass sheets 4.

Further, in the second phase subsequent to the first phase of the finishing step, only the cut surface 2b of the resin sheet 2 that is left in the unprocessed state is processed. Thus, a processing method suited to finish the resin can be selected for use, and hence the cut surface 2b of the resin sheet 2 can be finished efficiently with a predetermined accuracy. Specifically, the cutting work is carried out to finish the cut surface 2b of the resin sheet 2 with a predetermined accuracy. The cutting work is executed through use of a working tool such as an end mill, in which the distance between adjacent blade portions is large so that the working tool is not easily clogged. Due to this aspect, the feed speed of the working tool may be increased so as to finish the cut surface 2b of the resin sheet 2 efficiently.

As described above, in the twentieth embodiment, the finishing of the cut surface 1b of the laminate 1, which may be completed even in a single phase, is executed in two separate phases intendedly. Therefore, it seems that the man-hours and cost required to finish the cut surface 1b of the laminate 1 are increased, but the amount of processing efficiency enhanced by employing the twentieth embodiment is larger than the amount of processing efficiency decreased due to the problem that may arise in the case where the cut surface 1b of the laminate 1 is to be finished in a single phase. Thus, according to this embodiment, the cut surface 1b of the laminate 1 obtained by integrally laminating the glass sheets 4 on the resin sheet 2 can be finished efficiently.

Note that, in the grinding to be executed in the first phase, from the viewpoint of preventing the clogging of the grinding surface 31 of the grinding tool 30 and therefore preventing the breaking of the glass sheets 4 due to the clogging to the extent possible, it is desired to process only the cut surfaces 4b of the glass sheets 4. However, a dimensional tolerance or the like is generally set for the thickness of the laminate 1, and hence, when only the cut surfaces 4b of the glass sheets 4 are to be ground without grinding any part of the cut surface 2b of the resin sheet 2, it is necessary to manage and control grinding conditions (feed amount, posture, and the like of the grinding tool 30) with extreme precision, thus leading to a risk of increase in processing cost on the contrary. In this respect, according to this embodiment, in the first phase in which the grinding is executed, at least a part of the cut surface 2b of the resin sheet 2 is left in the unprocessed state. Conversely, a part of the cut surface 2b of the resin sheet 2 is allowed to be ground in the first phase. Therefore, the grinding conditions in the first phase can be relaxed, and the grinding can be executed rapidly.

The processing method for the laminate 1 according to the twentieth embodiment is described above, and various modifications may be made thereto.

Figure 31A:
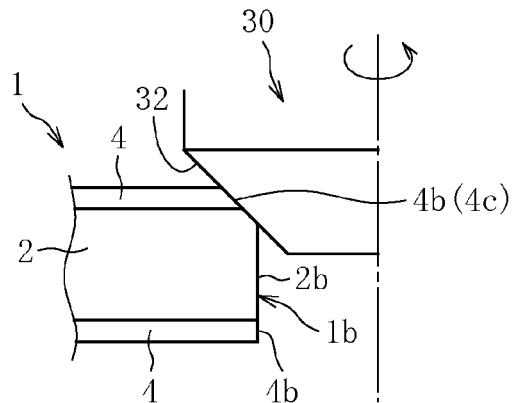
FIG. 31a is a conceptual view illustrating a modification example of the first phase according to the twentieth embodiment.
Figure 31B:
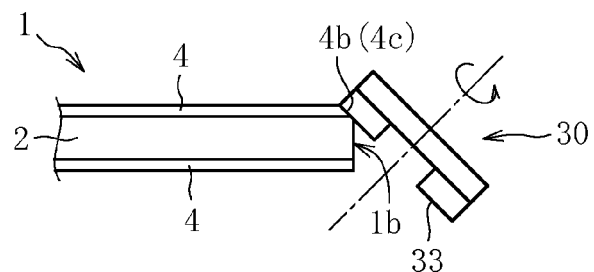
FIG. 31b is a conceptual view illustrating another modification example of the first phase according to the twentieth embodiment.

For example, as the grinding tool 30 to be used for finishing the cut surfaces 4b of the glass sheets 4 in the first phase of the finishing step, there may be used, for example, a grinding tool 30 having a tapered grinding surface 32 as illustrated in FIG. 31a, and a grinding tool 30 having a disc-like grinding surface 33 as illustrated in FIG. 31b. In the case of using the grinding tool 30 as illustrated in FIG. 31a or 31b, it is necessary to individually execute a process of finishing the cut surface 4b of the upper glass sheet 4 and a process of finishing the cut surface 4b of the lower glass sheet 4. However, the chips generated along with the grinding can be discharged more efficiently as compared to the above-mentioned embodiment, and hence the feed speed of the grinding tool 30 can be increased by an amount corresponding to the increase in efficiency, with the result that each glass sheet 4 can be finished efficiently. Also in the case of using the grinding tool 30 as illustrated in FIG. 31a or 31b, it is desired that the grinding for finishing the cut surfaces 4b of the glass sheets 4 be executed as the so-called constant-pressure grinding, which is carried out under a state in which the grinding tool 30 is brought into contact with each glass sheet 4 at a constant contact force.

Further, in the first phase of the finishing step, the grinding may be executed a plurality of times through use of grinding tools 30 having different surface roughnesses (grit sizes) of the grinding surfaces. Although illustration is omitted, a case of using three types of grinding tools having different surface roughnesses of the grinding surfaces is taken as an example. First, the end portion of each glass sheet 4 is roughly ground through use of a grinding tool 30 having the largest surface roughness of the grinding surface (grinding tool 30 having a grinding surface with a grit size of, for example, #120). Subsequently, the end portion of the glass sheet 4 is roughly finished through use of a grinding tool 30 having the second largest surface roughness of the grinding surface (grinding tool 30 having a grinding surface with a grit size of, for example, #400). Finally, the end portion of the glass sheet 4 is precisely finished through use of a grinding tool 30 having the smallest surface roughness of the grinding surface (grinding tool 30 having a grinding surface with a grit size of, for example, #1000). With this method, the cut surface 4b of the glass sheet 4 is easily finished in a more rapid manner as compared to the case of finishing the cut surface 4b of the glass sheet 4 with a single grinding tool 30 as described with reference to FIGS. 29b and 29c.

Further, the processing method that may be employed for the second phase of the finishing step is not limited to the cutting work, and the grinding may be employed similarly to the first phase. This is because the cut surfaces 4b of the glass sheets 4 are not processed in the second phase, and hence, even when large resin chips are generated due to the clogging of the grinding tool that occurs along with the grinding of the cut surface 2b of the resin sheet 2 in the second phase, the breaking of the glass sheets 4 due to the resin chips can be prevented to the extent possible.

Figure 32A:
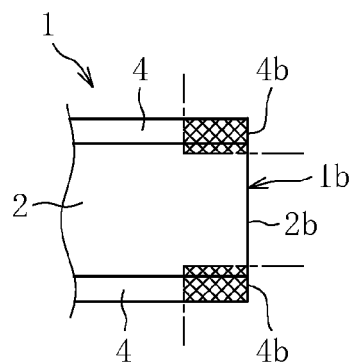
FIG. 32a is a conceptual view illustrating a first phase according to a modification example of the twentieth embodiment.
Figure 32B:
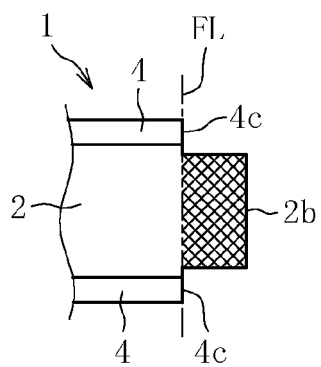
FIG. 32b is a conceptual view illustrating a second phase according to the modification example of the twentieth embodiment.
Figure 32C:
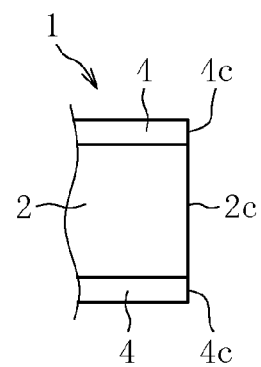
FIG. 32c is a partial side view illustrating the laminate after completion of the first phase and the second phase according to the modification example of the twentieth embodiment.

Further, the manner of finishing the cut surface 1b of the laminate 1, that is, the manner of finishing the cut surfaces 4b of the glass sheets 4 and the cut surface 2b of the resin sheet 2 is not even limited to that of the above-mentioned embodiment, and may be changed arbitrarily. For example, in the first phase of the finishing step, as illustrated in FIG. 32a, the end portions including the cut surfaces 4b of the glass sheets 4 are ground into a rectangular shape in cross section (portions of the glass sheets 4 indicated by cross hatching in FIG. 32a are ground), and thus the cut surfaces 4b are finished into the smooth surfaces 4c that are parallel to the thickness direction of the laminate 1 [see FIG. 32b]. After that, in the second phase, the end portion including the cut surface 2b of the resin sheet 2 is cut off by cutting work along the preset finishing line FL illustrated in FIG. 32b (a portion of the resin sheet 2 indicated by cross hatching in FIG. 32b is cut off by cutting work). In this manner, as illustrated in FIG. 32c, the cut surfaces 4b of the glass sheets 4 may be finished into the smooth surfaces 4c that are parallel to the thickness direction of the laminate 1, and the cut surface 2b of the resin sheet 2 may also be finished into the smooth surface 2c that is parallel to the thickness direction of the laminate 1.

The above description is directed to the case where the processing method according to the twentieth embodiment is applied when finishing the cut surface 1b of the laminate 1 obtained by integrally laminating the glass sheets 4 on both surfaces of the resin sheet 2, but the processing method according to the twentieth embodiment may also be applied suitably when finishing the cut surface 1b of a laminate 1 obtained by integrally laminating the glass sheet on only one of both surfaces of the resin sheet 2. As an example thereof, FIGS. 33a to 33c schematically illustrate a state of finishing the cut surface 1b of the laminate 1 obtained by integrally laminating the glass sheet 4 on only a front surface (upper surface) of the resin sheet 2.

Figure 33A:
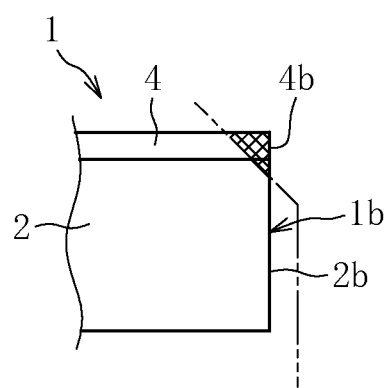
FIG. 33a is a conceptual view illustrating a first phase according to another modification example of the twentieth embodiment.
Figure 33B:
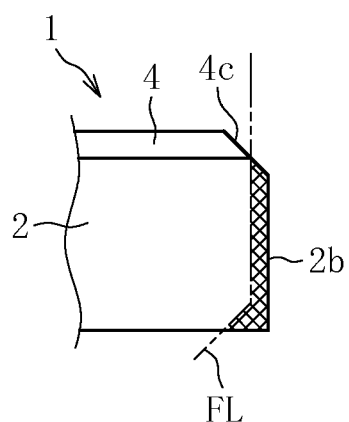
FIG. 33b is a conceptual view illustrating a second phase according to the another modification example of the twentieth embodiment.
Figure 33C:
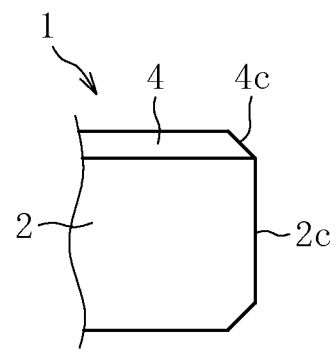
FIG. 33c is a partial side view illustrating the laminate after completion of the first phase and the second phase according to the another modification example of the twentieth embodiment.

First, in the first phase illustrated in FIG. 33a, the end portion including the cut surface 4b of the glass sheet 4 is ground, that is, a portion indicated by cross hatching in FIG. 33a is ground, and thus the cut surface 4b of the glass sheet 4 is finished into the smooth surface 4c having a tapered shape as illustrated in FIG. 33b. Subsequently, in the second phase illustrated in FIG. 33b, the end portion including the cut surface 2b of the resin sheet 2 is cut off by cutting work, that is, a portion indicated by cross hatching in FIG. 33b is cut off by cutting work (the end portion of the resin sheet 2 is cut off by cutting work along the preset finishing line FL), and thus the cut surface 2b of the resin sheet 2 is finished into the smooth surface 2c that is formed continuously of a flat surface extending along the thickness direction of the laminate 1 and a tapered surface inclined with respect to the thickness direction of the laminate 1.

Twenty-First Embodiment

A twenty-first embodiment of the present invention relates to a cutting method for a brittle sheet-like object as typified by a glass sheet and a laminate obtained by integrally laminating a glass sheet on a resin sheet. This cutting method is, for example, applied to the cutting step of the above-mentioned twentieth embodiment.

Now, the twenty-first embodiment is described with reference to the drawings.

FIG. 34a is a schematic plan view illustrating a cutting apparatus 40 according to the twenty-first embodiment, and FIG. 34b is a schematic partial sectional view illustrating the cutting apparatus 40 (schematic sectional view taken on the arrows X-X in FIG. 34a). This cutting apparatus 40 is used for cutting a brittle sheet-like object A such as a glass sheet alone or a laminate obtained by integrally laminating a glass sheet on at least one of both surfaces of a resin sheet. More specifically, as illustrated in FIGS. 34a and 34b, the cutting apparatus 40 is used for carrying out so-called laser fusing, which involves radiating the laser beam LB from the top along a preset cutting line CL of the brittle sheet-like object A placed in a horizontal posture, and sequentially melting and removing the preset cutting line CL due to irradiation heat of the laser beam LB, to thereby separate and divide the brittle sheet-like object A into a product portion and a non-product portion across the preset cutting line CL. In this case, as illustrated also in FIG. 34c, there is described an example of the cutting apparatus 40 to be used for cutting out a product portion M having an oblong shape from the laminate 1 that is the brittle sheet-like object A having a substantially rectangular shape in plan view as an overall shape, to thereby divide the laminate 1 into the product portion M having an oblong shape and a non-product portion N having a hollow rectangular shape. Note that, the product portion M having an oblong shape is used, for example, for a cover member (protective cover) of a touch panel to be built into a portable electronic device.

First, the structure of the laminate 1 that is the brittle sheet-like object A to be cut is described. As illustrated in FIG. 34b, the laminate 1 is obtained by integrally laminating the glass sheets 4 on both surfaces of the resin sheet 2 through an intermediation of the adhesive layers 3, respectively. The adhesive layers 3 may be omitted, and in the case where the adhesive layers 3 are omitted, the glass sheets 4 may be integrally laminated on the resin sheet 2 by, for example, welding.

Next, the structure of the cutting apparatus 40 is described in detail. As illustrated in FIG. 34b, the cutting apparatus 40 mainly comprises a laser irradiation apparatus 41 and a gas jet nozzle 42 arranged above the laminate 1, and a support member 43 arranged below the laminate 1. The laser irradiation apparatus 41 and the gas jet nozzle 42 are movable relative to the support member 43 in a direction along a horizontal plane.

The laser irradiation apparatus 41 mainly comprises a laser oscillator serving as a source of the laser beam LB as typified by, for example, a carbon dioxide laser and a YAG laser, and optical components such as a condenser lens. The laser irradiation apparatus 41 is configured to radiate the laser beam LB in a substantially perpendicular direction toward the preset cutting line CL of the laminate 1. The laser beam LB may be continuous light and pulsed light.

The gas jet nozzle 42 is configured to jet the assist gas AG toward a portion irradiated with the laser beam LB in the laminate 1 so as to blow off molten foreign matter that is generated at the cut (fused) portion of the laminate 1 along with the irradiation of the preset cutting line CL of the laminate 1 with the laser beam LB. In this embodiment, the gas jet nozzle 42 is arranged at a position above the product portion M side of the laminate 1, and the assist gas AG is obliquely jetted from the position above the product portion M side toward the portion irradiated with the laser beam LB. Thus, the molten foreign matter generated at the fused portion of the laminate 1 is blown off toward the non-product portion N by the assist gas AG. Therefore, it is possible to prevent, to the extent possible, such a situation that the molten foreign matter adheres to the cut end surface or the like of the product portion M to cause a defective shape of the product portion M.

Note that, the manner of arranging the gas jet nozzle 42, that is, the manner of jetting the assist gas AG is not limited to that of the above-mentioned embodiment. For example, the gas jet nozzle 42 may be arranged directly above the preset cutting line CL, and the assist gas AG may be jetted in a substantially perpendicular direction to the portion irradiated with the laser beam LB. Further, the gas jet nozzle 42 may be provided as necessary, and is not provided necessarily.

The support member 43 is a member for supporting the laminate 1 to be cut in a horizontal posture from the bottom side, and comprises a first support section 45 capable of supporting the product portion M having an oblong shape (or a region to be formed into the product portion M), and a second support section 46 capable of supporting the non-product portion N having a hollow rectangular shape (or a region to be formed into the non-product portion N). Both the support sections 45 and 46 are partitioned by the preset cutting line CL of the laminate 1, in other words, a groove portion 44 provided along an irradiation path of the laser beam LB. The groove portion 44 is a portion provided so as to prevent increase in residual strain of the cut end surface and generation of small defects in the cut end surface to the extent possible. The increase in residual strain and the generation of small defects may occur when the laser beam LB passing through the laminate 1 reflects in proximity to the lower surface of the laminate 1 and re-enters the lower surface of the laminate 1 so as to apply unnecessary irradiation heat to the cut end surface of the laminate 1 (in particular, the product portion M).

As illustrated in FIG. 34*b*, the first support section 45 is formed so that a support surface 45*a* thereof is located slightly higher than a support surface 46*a* of the second support section 46. Thus, a slight height difference δ2 is provided between both the support surfaces 45*a* and 46*a*. In this case, a spacer 47 having a thickness corresponding to a value of the height difference δ2 to be provided is integrally laminated on an upper surface of a base portion 45' formed at a thickness that is substantially equal to the thickness of the second support section 46, to thereby provide the height difference δ2 between the support surfaces 45*a* and 46*a* of both the support sections 45 and 46. That is, in this embodiment, the first support section 45 is formed of the base portion 45' and the spacer 47 integrally laminated on the upper surface thereof. The height difference δ2 between both the support surfaces 45*a* and 46*a* is set to 0.01 mm or more and 0.2 mm or less (0.01 mm≤δ2≤0.2 mm), and the reason for setting such a numerical range of the height difference δ2 is described later in detail. The spacer 47 that may be used is not particularly limited, and for example, a tape material and a shim plate made of a resin, a rubber, or a metal may be used. The spacer 47 may be formed of a single shim plate or the like, or may be formed by laminating a plurality of shim plates or the like.

Figure 35A:
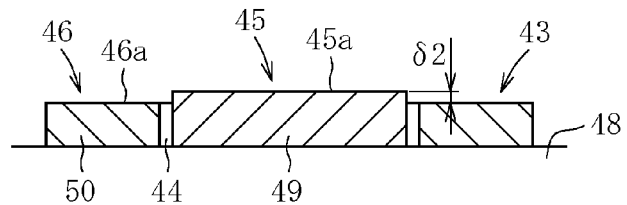
FIG. 35a is a schematic sectional view illustrating a modification example of a support member as a component of the cutting apparatus.
Figure 35B:
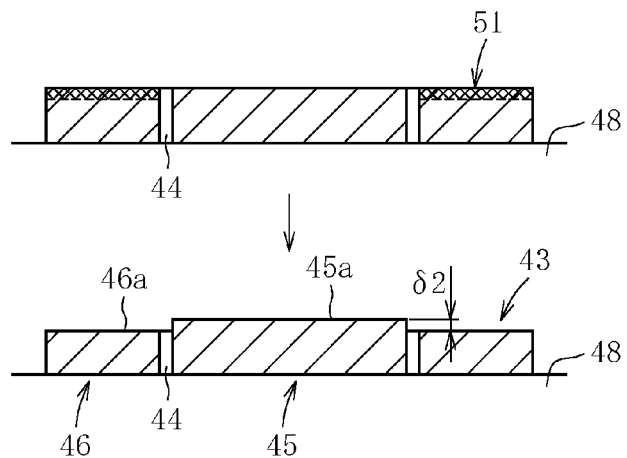
FIG. 35b is a schematic sectional view illustrating another modification example of the support member as the component of the cutting apparatus.

Note that, means for obtaining the support member 43 having the predetermined height difference δ2 provided between the support surfaces 45*a* and 46*a* of both the support sections 45 and 46 is not limited to that described above. That is, as illustrated in FIG. 35*a*, the support member 43 may be obtained in such a manner that plate members 49 and 50 having a thickness difference corresponding to the height difference δ2 to be provided are adhered to an upper surface of a base member 48 for holding the support member 43. Alternatively, as illustrated in FIG. 35*b*, the support member 43 may be formed by preparing a plate member 51 having the groove portion 44 provided along the irradiation path of the laser beam LB (preset cutting line CL), and shaving off a predetermined region of the plate member 51 (region to be formed into the second support section 46, which is indicated by cross hatching in FIG. 35*b*) by turning. Note that, in the structure illustrated in FIG. 35*b*, the amount of man-hours required to manufacture the support member 43 is larger as compared to the structures illustrated in FIGS. 34*b* and 35*a*, and hence the support member 43 illustrated in FIG. 34*b* or 35*a* is preferred.

Although illustration is omitted, the cutting apparatus 40 may further comprise suction means for sucking the laminate 1 onto the support member 43. When the cutting process (melting and removing) for the preset cutting line CL is sequentially executed under a state in which the suction means described above is provided so as to suck the laminate 1 onto the support member 43, the movement of the laminate 1 relative to the support member 43 can be prevented to the extent possible. Thus, the cutting accuracy is enhanced, and hence a high-quality product portion M can be obtained.

The cutting apparatus 40 according to the twenty-first embodiment has the above-mentioned structure, and is configured to divide the laminate 1, which is supported in a horizontal posture from the bottom side by the support member 43, into the product portion M and the non-product portion N across the preset cutting line CL in the following manner. First, the laser irradiation apparatus 41 radiates the laser beam LB toward the laminate 1 (or the preset cutting line CL of the laminate 1) while moving the laser irradiation apparatus 41 and the gas jet nozzle 42 relative to the support member 43, to thereby melt and remove, in a sequential manner, the preset cutting line CL of the laminate 1 due to the irradiation heat of the laser beam LB. At this time, the gas jet nozzle 42 jets the assist gas AG toward the portion irradiated with the laser beam LB in the laminate 1 so as to blow off, toward the non-product portion N, the molten foreign matter that is formed along with the irradiation with the laser beam LB.

The laser irradiation apparatus 41 and the gas jet nozzle 42 may be moved relative to the support member 43 every time the laser beam LB radiated toward the preset cutting line CL (or a partial region of the preset cutting line CL) passes through the lower surface of the laminate 1. Alternatively, the laser irradiation apparatus 41 and the gas jet nozzle 42 may be moved relative to the support member 43 every time the partial region of the preset cutting line CL of the laminate 1 is molten and removed by a predetermined thickness. That is, the cutting of the preset cutting line CL may be completed when the laser beam LB is scanned in one loop along the preset cutting line CL of the laminate 1, or may be completed when the laser beam LB is scanned in a plurality of loops along the preset cutting line CL of the laminate 1. When the cutting of the preset cutting line CL is completed by melting and removing all the preset cutting line CL, as illustrated in FIG. 34c, the laminate 1 is then divided across the preset cutting line CL into the product portion M having an oblong shape and the non-product portion N having a hollow rectangular shape.

Further, as the cutting apparatus 40 to be used for dividing the laminate 1 into the product portion M and the non-product portion N in the manner described above, the cutting apparatus 40 used in this embodiment comprises the support member 43 in which the support surface 45a of the first support section 45 for supporting the product portion M is located higher than the support surface 46a of the second support section 46. Thus, the cutting (in this case, melting and removing) of the preset cutting line CL can be progressed and completed under a state in which the product portion M (or the region to be formed into the product portion M) is located constantly higher than the non-product portion N (or the region to be formed into the non-product portion N). Therefore, it is possible to reduce, to the extent possible, the risk in that a small defect such as a microcrack is formed in the cut end surface of the glass sheet 4 (in particular, the lower glass sheet 4) that forms the product portion M in the phase immediately before the completion of the cutting of the preset cutting line CL due to the fact that the product portion M is located lower than the non-product portion N. The reason is as follows. That is, with this structure, even when the non-product portion N drops off, for example, in the phase immediately before the completion of the cutting (laser fusing) of the laminate 1 and hence the lower glass sheet 4 that forms the laminate 1 is forcibly snapped, the small defect such as a microcrack is formed not in the cut end surface of the product portion M but in the cut end surface of the non-product portion N.

In particular, in a case where the laminate 1 comprising the glass sheet 4 that is thinned to a thickness of about 0.01 mm or more and 0.3 mm or less (in this embodiment, the glass sheet 4 having a thickness of 0.1 mm) is divided into the product portion M and the non-product portion N across the preset cutting line CL, the glass sheet 4 (in particular, the lower glass sheet 4) that forms the laminate 1 is liable to be snapped forcibly in the phase immediately before the completion of the cutting of the preset cutting line CL, and hence the cutting apparatus 40 according to this embodiment is significantly advantageous.

Note that, when the cutting (melting and removing) of the preset cutting line CL is completed under the state in which the product portion M is located higher than the non-product portion N, as described above, it is possible to reduce, to the extent possible, the risk in that the small defect is formed in the cut end surface of the product portion M. However, when the height difference δ2 between both the support surfaces 45a and 46a is extremely small, it is hard to deny a risk in that a part or all of the support surface 45a of the first support section 45 is located lower than the support surface 46a of the second support section 46 due to effects of a processing error at the time of manufacturing the support member 43 and/or thermal deformation of at least one of both the support sections 45 and 46 along with the irradiation with the laser beam LB. As a measure against the risk, the support surface 45a of the first support section 45 is located higher by 0.01 mm or more than the support surface 46a of the second support section 46. Thus, the height difference δ2 between both the support surfaces 45a and 46a can absorb the amount of the processing error at the time of manufacturing the support member 43 and the amount of the thermal deformation of the support sections 45 and 46 along with the irradiation with the laser beam LB. In a case where the support surface 45a of the first support section 45 is located higher by more than 0.2 mm than the support surface 46a of the second support section 46, on the other hand, the amount of hanging down the non-product portion N due to a self-weight thereof becomes larger, and due to a bending stress generated therefrom, the small defect is liable to be formed in the cut end surface of the glass sheet 4 that forms the product portion M, thus increasing the risk of the breaking of the glass sheet 4 that forms the product portion M.

As described above, when the support surface 45a of the first support section 45 is located higher than the support surface 46a of the second support section 46 within the range of 0.01 mm or more and 0.2 mm or less (the height difference δ2 between both the support surfaces 45a and 46a is set to 0.01 mm or more and 0.2 mm or less) as in this embodiment, a high-quality product portion M can be obtained stably.

The cutting apparatus 40 and the cutting method for the brittle sheet-like object A according to the twenty-first embodiment are described above, and various modifications may be made to the cutting apparatus 40 (cutting method).

For example, in the above-mentioned cutting apparatus 40, both of the first support section 45 and the second support section 46 that form the support member 43 are provided in a stationary manner, but the cutting apparatus 40 may further comprise an elevating mechanism for raising and lowering at least one of both the support sections 45 and 46. With this structure, during the execution of the cutting process for the preset cutting line CL, the heights of the support surfaces 45a and 46a of both the support sections 45 and 46 can be adjusted arbitrarily, and hence the cutting of the preset cutting line CL is easily progressed and completed under a state in which the laminate 1 is held in an optimum posture.

Figure 36A:
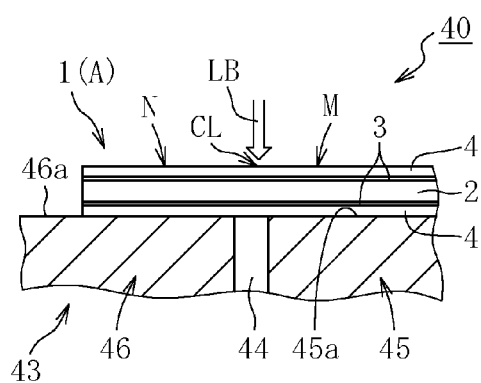
FIG. 36a is an enlarged sectional view illustrating a main part of a cutting apparatus in a phase in which laser fusing is started according to a modification example of the twenty-first embodiment.
Figure 36B:
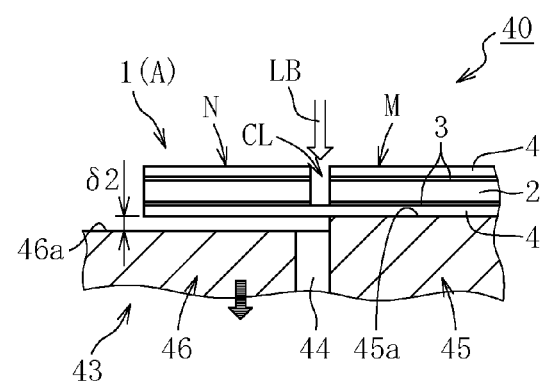
FIG. 36b is an enlarged sectional view illustrating a main part of the cutting apparatus immediately before the laser fusing is completed according to the modification example of the twenty-first embodiment.

Specifically, for example, as illustrated in FIG. 36a, during a period after the start of the cutting of the preset cutting line CL until immediately before the completion of the cutting of the preset cutting line CL, the product portion M and the non-product portion N are located at the same height. After that, as illustrated in FIG. 36b, when the cutting process is progressed to the state immediately before the completion of the cutting of the preset cutting line CL, the first support section 45 and the second support section 46 are raised and lowered relatively (in the example of FIG. 36b, the second support section 46 is lowered). Through this operation, the product portion M is located higher than the non-product portion N, and the cutting of the preset cutting line CL is completed in this state.

With this structure, the cutting process for the preset cutting line CL can be progressed under a state in which the product portion M and the non-product portion N are located within the same plane, thus producing an advantage in that the probability of formation of the small defect caused by the product portion M or the non-product portion N that is hung down due to the self-weight thereof can also be reduced to the extent possible.

As a matter of course, the first support section 45 and the second support section 46 may be raised and lowered relatively not at the time immediately before the completion of the cutting of the preset cutting line CL but at the time, for example, when the cutting of the preset cutting line CL is progressed approximately halfway through the entire process. Also through this operation, the support surface 45*a* of the first support section 45 may be located higher than the support surface 46*a* of the second support section 46 (the product portion M may be located higher than the non-product portion N), and the cutting of the preset cutting line CL may be completed in this state. That is, it is only necessary that the support surface 45*a* of the first support section 45 be located higher than the support surface 46*a* of the second support section 46 in the phase immediately before the completion of the cutting of the preset cutting line CL, and the cutting of the preset cutting line CL be completed in this state.

Figure 37:
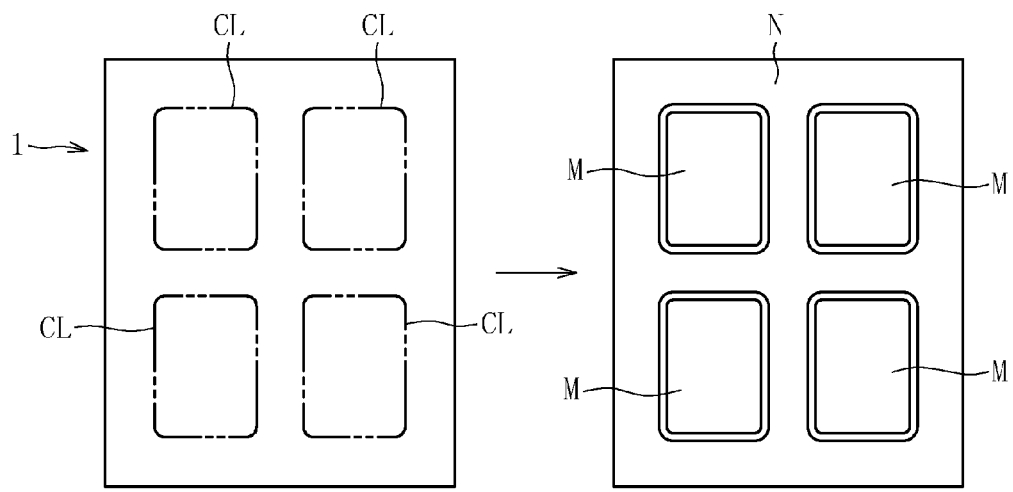
FIG. 37 is a schematic plan view illustrating a modification example of a manner of cutting the brittle sheet-like object according to the twenty-first embodiment.
Figure 38:
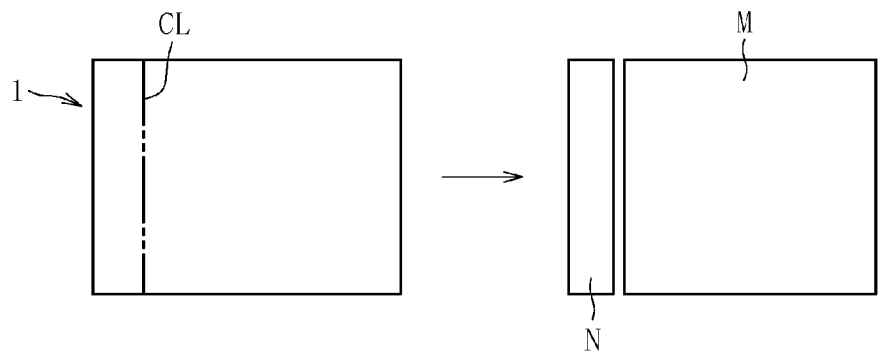
FIG. 38 is a schematic plan view illustrating another modification example of the manner of cutting the brittle sheet-like object according to the twenty-first embodiment.
Figure 39A:
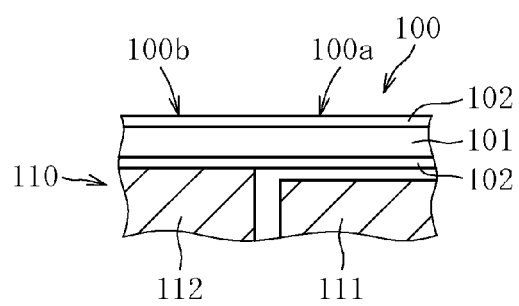
FIG. 39a is an enlarged sectional view illustrating a main part of a conventional cutting apparatus in a phase in which laser fusing is started.
Figure 39B:
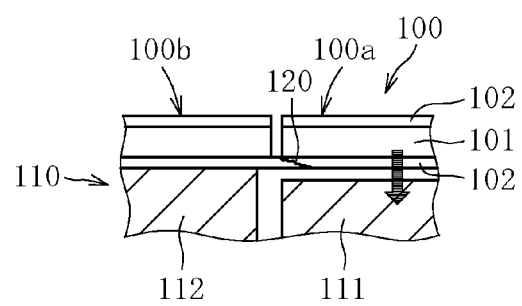
FIG. 39b is an enlarged sectional view illustrating a main part of the conventional cutting apparatus immediately before the laser fusing is completed.

The above description is directed to the case where the laminate 1 that is the brittle sheet-like object A is divided into one product portion M and one non-product portion N. However, the present invention may also be applied suitably to a case where, as illustrated in FIG. 37, a plurality of (four) product portions M are cut out from a laminate 1 having a plurality of (in the example of FIG. 37, four) preset cutting lines CL, to thereby divide the laminate 1 into the four product portions M and one non-product portion N. The present invention may also be applied suitably to a case where, as illustrated in FIG. 38, a laminate 1 having a linear preset cutting line CL is irradiated with the laser beam LB to cut the preset cutting line CL, to thereby divide the laminate 1 into a product portion M and a non-product portion N across the preset cutting line CL.

Further, the above description is directed to the case where, as the brittle sheet-like object A, the laminate 1 obtained by integrally laminating the glass sheets 4 on both surfaces of the resin sheet 2 is divided into the product portion M and the non-product portion N across the preset cutting line CL, but the present invention may also be applied suitably to a case where, as the brittle sheet-like object A, a glass sheet alone or a laminate obtained by integrally laminating the glass sheet 4 on only one of both surfaces of the resin sheet 2 is divided into the product portion M and the non-product portion N.

Further, the cutting apparatus 40 and the cutting method according to the twenty-first embodiment may be used not only to the case of executing the laser fusing described above, but also suitably to a case of executing so-called laser cleaving (not shown).

REFERENCE SIGNS LIST

1 laminate
1*a* corner portion
2 resin sheet
2*a* end surface
3 adhesive layer
4 glass sheet
4*a* end surface
5 depressed portion
5*a* bending portion
6 projecting portion
6*a* bending portion
7 opening portion
7*a* bending portion
20 protective tape

The invention claimed is:

1. A laminate, comprising:
a resin sheet; and
a glass sheet having a thickness of 300 μm or less,
the glass sheet being integrally laminated on at least one of both surfaces of the resin sheet,
wherein an end surface of the glass sheet is chamfered, and
wherein at least a part of an end surface of the resin sheet protrudes with respect to the end surface of the glass sheet.

2. The laminate according to claim 1, wherein the glass sheet is integrally laminated on each of both the surfaces of the resin sheet.

3. The laminate according to claim 1, wherein a corner portion formed by crossing adjacent two edges has a curved shape or a polygonal shape obtained by combining obtuse angles.

4. The laminate according to claim 1, further comprising a deformed portion formed of a projecting portion or a depressed portion on an outer periphery of the laminate,
wherein the deformed portion comprises a bending portion, and the bending portion has a curved shape.

5. The laminate according to claim 1, further comprising an opening portion formed in a flat surface of the laminate,
wherein the opening portion comprises a bending portion on a periphery thereof, and the bending portion has a curved shape.

6. A laminate, comprising:
a resin sheet; and
glass sheets having a thickness of 300 μm or less,
the glass sheets being integrally laminated on both surfaces of the resin sheet,
wherein at least a part of an end surface of the resin sheet protrudes with respect to end surfaces of the glass sheets, and
wherein each of the end surfaces of the glass sheets comprises a tapered surface inclined away from the end surface of the resin sheet toward an outer surface side of each of the glass sheets.

7. The laminate according to claim 6, wherein the resin sheet and the glass sheets are adhered to each other with adhesive layers.

8. The laminate according to claim 6, wherein the end surfaces of the glass sheets and the end surface of the resin sheet are formed continuous with each other into a projecting curved surface.

9. A laminate, comprising:
a resin sheet; and
glass sheets having a thickness of 300 μm or less,
the glass sheets being integrally laminated on both surfaces of the resin sheet,
wherein at least a part of an end surface of the resin sheet protrudes with respect to end surfaces of the glass sheets, and
wherein the resin sheet and the glass sheets are adhered to each other with adhesive layers.

10. The laminate according to claim 9, wherein end surfaces of the adhesive layers protrude with respect to the end surfaces of the glass sheets.

11. A laminate, comprising:
a resin sheet; and
glass sheets having a thickness of 300 μm or less,
the glass sheets being integrally laminated on both surfaces of the resin sheet, wherein at least a part of an end surface of the resin sheet protrudes with respect to end surfaces of the glass sheets, and wherein the end surfaces of the glass sheets and the end surface of the resin sheet are formed continuous with each other into a projecting curved surface.

* * * * *